United States Patent
Miyauchi et al.

(10) Patent No.: US 9,583,278 B2
(45) Date of Patent: Feb. 28, 2017

(54) BINDER COMPOSITION FOR ELECTRICAL STORAGE DEVICE ELECTRODES, SLURRY FOR ELECTRICAL STORAGE DEVICE ELECTRODES, ELECTRICAL STORAGE DEVICE ELECTRODE, AND ELECTRICAL STORAGE DEVICE

(71) Applicant: JSR CORPORATION, Minato-ku (JP)

(72) Inventors: Hiroyuki Miyauchi, Minato-ku (JP); Tatsuya Abe, Minato-ku (JP); Shinsaku Ugawa, Minato-ku (JP); Kouji Sumiya, Minato-ku (JP); Yingjia Xu, Minato-ku (JP); Maki Maegawa, Minato-ku (JP); Hironori Kitaguchi, Minato-ku (JP)

(73) Assignee: JSR CORPORATION, Minato-ku (JP)

( * ) Notice: Subject to any disclaimer, the term of this patent is extended or adjusted under 35 U.S.C. 154(b) by 123 days.

(21) Appl. No.: 14/408,803

(22) PCT Filed: Jun. 13, 2013

(86) PCT No.: PCT/JP2013/066339
§ 371 (c)(1),
(2) Date: Dec. 17, 2014

(87) PCT Pub. No.: WO2013/191080
PCT Pub. Date: Dec. 27, 2013

(65) Prior Publication Data
US 2015/0187516 A1 Jul. 2, 2015

(30) Foreign Application Priority Data

Jun. 18, 2012 (JP) .................................. 2012-136563
Oct. 12, 2012 (JP) .................................. 2012-226830
(Continued)

(51) Int. Cl.
*H01G 11/42* (2013.01)
*H01M 4/134* (2010.01)
(Continued)

(52) U.S. Cl.
CPC ............. *H01G 11/42* (2013.01); *H01G 11/04* (2013.01); *H01G 11/06* (2013.01); *H01G 11/30* (2013.01);
(Continued)

(58) Field of Classification Search
CPC ........ H01G 11/30; H01G 11/42; H01G 11/48; H01G 9/00; H01G 9/155
See application file for complete search history.

(56) References Cited

U.S. PATENT DOCUMENTS 6,300,013 B1 10/2001 Yamada et al.
7,037,581 B2 5/2006 Aramata et al.
(Continued)

FOREIGN PATENT DOCUMENTS

JP     6 32058    2/1994
JP   11 133539   5/1999
(Continued)

OTHER PUBLICATIONS

U.S. Appl. No. 14/679,431, filed Apr. 6, 2015, Kitaguchi, et al.
(Continued)

*Primary Examiner* — Nguyen Ha
(74) *Attorney, Agent, or Firm* — Oblon, McClelland, Maier & Neustadt, L.L.P.

(57) ABSTRACT

An electrical storage device electrode binder composition containing a polymer (A) and a liquid medium (B). A repeating unit (A4) derived from an unsaturated carboxylic acid compound is included in the polymer (A) in an amount of 5-40 parts by mass based on 100 parts by mass of the total repeating units in polymer (A). The polymer (A) is in
(Continued)

particle form, and the polymer particles have a surface acid content of 1-6 mmol/g.

16 Claims, 1 Drawing Sheet

(30) Foreign Application Priority Data

Oct. 25, 2012 (JP) .................................. 2012-235513
Oct. 25, 2012 (JP) .................................. 2012-235514

(51) Int. Cl.
*H01M 4/131* (2010.01)
*H01M 4/62* (2006.01)
*H01G 11/30* (2013.01)
*H01G 11/38* (2013.01)
*H01G 11/04* (2013.01)
*H01G 11/66* (2013.01)
*H01G 11/06* (2013.01)
*H01G 11/50* (2013.01)

(52) U.S. Cl.
CPC ............. *H01G 11/38* (2013.01); *H01G 11/50* (2013.01); *H01G 11/66* (2013.01); *H01M 4/131* (2013.01); *H01M 4/134* (2013.01); *H01M 4/622* (2013.01); *Y02E 60/122* (2013.01); *Y02E 60/13* (2013.01); *Y02P 70/54* (2015.11)

(56) References Cited

U.S. PATENT DOCUMENTS

| | | | |
|---|---|---|---|
| 7,141,187 B2 | 11/2006 | Kosuzu et al. | |
| 7,316,792 B2 | 1/2008 | Kosuzu et al. | |
| 7,803,290 B2 | 9/2010 | Kosuzu et al. | |
| 8,663,839 B2 | 3/2014 | Maegawa et al. | |
| 8,709,652 B2 | 4/2014 | Maegawa et al. | |
| 8,709,653 B2 | 4/2014 | Lee et al. | |
| 2010/0323098 A1 | 12/2010 | Kosuzu et al. | |
| 2011/0159362 A1 | 6/2011 | Wakizaki et al. | |
| 2012/0189913 A1 | 7/2012 | Wakizaka et al. | |
| 2012/0295159 A1 | 11/2012 | Kobayashi | |
| 2013/0052530 A1 | 2/2013 | Kitaguchi et al. | |
| 2013/0101897 A1 | 4/2013 | Fukui et al. | |
| 2013/0323588 A1* | 12/2013 | Kajiwara | H01G 9/042 429/211 |
| 2014/0038041 A1* | 2/2014 | Kajiwara | H01G 11/30 429/211 |
| 2014/0217322 A1 | 8/2014 | Yamada et al. | |
| 2014/0234535 A1 | 8/2014 | Lee et al. | |
| 2014/0272523 A1 | 9/2014 | Otsuka et al. | |

FOREIGN PATENT DOCUMENTS

| | | |
|---|---|---|
| JP | 2000 299109 | 10/2000 |
| JP | 2000 357515 | 12/2000 |
| JP | 2004 47404 | 2/2004 |
| JP | 2004 185810 | 7/2004 |
| JP | 2005 259697 | 9/2005 |
| JP | 2006 260782 | 9/2006 |
| JP | 2009224099 A | 10/2009 |
| JP | 2010 3703 | 1/2010 |
| JP | 2010-192434 A | 9/2010 |
| JP | 2010 205722 | 9/2010 |
| JP | 2011 49177 | 3/2011 |
| JP | 2011 096463 | 8/2011 |
| JP | 2011 192563 | 9/2011 |
| JP | 2011 204592 | 10/2011 |
| JP | 2012 9775 | 1/2012 |
| JP | 02013211246 A * | 10/2013 |
| JP | 5477610 | 2/2014 |
| WO | 2010 024328 | 3/2010 |
| WO | 2011 037142 | 3/2011 |
| WO | 2011 096463 | 8/2011 |
| WO | 2013/191080 A1 | 12/2013 |

OTHER PUBLICATIONS

U.S. Appl. No. 14/427,233, filed Mar. 10, 2015, Katsuda, et al.

Notification of Reasons for Refusal in Japanese Patent Application No. 2014-006731, drafting day Oct. 31, 2016 (with computed generated English Translation).

International Search Report Issued Sep. 3, 2013 in PCT/JP13/066339 Filed Jun. 13, 2013.

John Hen, "Determination of Surface Carboxyl Groups in Styrene/Itaconic Acid Copolymer Latexes", Journal of Colloid and Interface Science, vol. 49, No. 3, pp. 425-432, (Dec. 1974).

Seigou Kawaguchi, et al., "Surface Characterization and Dissociation Properties of Carboxylic Acid Core-Shell Latex Particle by Potentiometric and Conductometric Titration", Journal of Colloid and Interface Science, vol. 176, pp. 362-369, (1995).

* cited by examiner

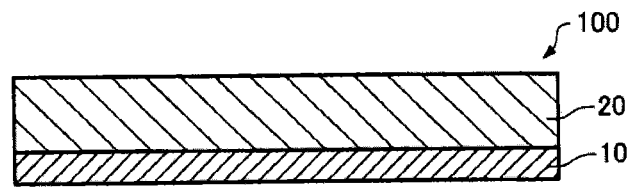

BINDER COMPOSITION FOR ELECTRICAL STORAGE DEVICE ELECTRODES, SLURRY FOR ELECTRICAL STORAGE DEVICE ELECTRODES, ELECTRICAL STORAGE DEVICE ELECTRODE, AND ELECTRICAL STORAGE DEVICE

TECHNICAL FIELD

The present invention relates to an electrical storage device electrode binder composition, an electrical storage device electrode slurry that includes the binder composition and an active material, an electrical storage device electrode that is produced by applying the slurry to a collector, and drying the applied slurry, and an electrical storage device that includes the electrode.

BACKGROUND ART

In recent years, a high-voltage electrical storage device having high energy density has been desired as a power supply for driving an electronic device. A lithium-ion battery, a lithium-ion capacitor, and the like have been expected to be such an electrical storage device.

An electrode used for such an electrical storage device is normally produced by applying a composition (electrode slurry) that includes an active material and a polymer that functions as a binder to the surface of a collector, and drying the applied composition. The polymer used as a binder is required to exhibit a capability to bind the active material, a capability to bind (bond) the active material and the collector, scratch resistance when winding the electrode, fall-off resistance (i.e., a fine powder of the active material or the like does not fall off from the layer (film) formed of the composition (hereinafter may be referred to as "active material layer") due to cutting or the like), and the like. When the polymer meets these requirements, it is possible to produce an electrical storage device that has a high degree of freedom with respect to the structural design (e.g., electrode folding method or winding radius), and can be reduced in size.

It was experimentally found that a capability to bind the active material, a capability to bind the active material and the collector, and the fall-off resistance have an almost proportional relationship. Note that these properties may be comprehensively referred to herein as "adhesion".

In recent years, use of a material having a high lithium occlusion capacity has been studied in order to implement an increase in output and energy density of the electrical storage device. For example, a technique has been studied that improves the lithium occlusion capacity by utilizing highly crystalline graphite as the active material to implement a capacity close to the theoretical lithium occlusion capacity (about 370 mAh/g) of a carbon material. JP-A-2004-185810 discloses a technique that utilizes a silicon material having a maximum theoretical lithium occlusion capacity of about 4200 mAh/g as the active material. It is considered that the capacity of the electrical storage device is significantly improved by utilizing an active material having a high lithium occlusion capacity.

However, an active material that utilizes a material having a high lithium occlusion capacity significantly changes in volume along with occlusion and release of lithium. Therefore, when a known electrode binder is applied to a material having a high lithium occlusion capacity, the active material may be removed due to a decrease in adhesion, and a significant decrease in capacity occurs along with charge and discharge, for example.

In order to improve the adhesion of the electrode binder, JP-A-2000-299109 and WO2011/096463 disclose a technique that controls the composition of the binder, and JP-A-2010-205722 and JP-A-2010-3703 disclose a technique that improve the above characteristics by utilizing a binder that includes an epoxy group or a hydroxyl group, for example. JP-A-2011-192563 and JP-A-2011-204592 disclose a technique that restrains the active material using the rigid molecular structure of polyimide to suppress a change in volume of the active material.

In order to use such an electrode binder in the actual production line, the electrode binder is required to exhibit excellent charge-discharge characteristics, excellent adhesion, and excellent storage stability (i.e., the electrode binder does not change in quality (e.g., due to precipitation of the polymer) even when the electrode binder is stored for a long time in a warehouse or the like). JP-A-2012-9775 discloses a technique that adds a preservative in order to improve the storage stability.

SUMMARY OF THE INVENTION

Technical Problem

However, the electrode binders disclosed in the above patent documents have problems in that adhesion is insufficient for using an active material that utilizes a material having a high lithium occlusion capacity, the resulting electrode deteriorates due to repeated charge and discharge, and durability sufficient for practical use cannot be obtained.

The electrode binder (to which a preservative is added) disclosed in JP-A-2012-9775 is merely evaluated in terms of the storage stability of the polymer particle dispersion (latex), and it is unclear whether or not it is possible to produce an electrical storage device having excellent characteristics using the composition that has been stored (i.e., JP-A-2012-9775 is silent about the long-term storage stability of the electrode binder).

Several aspects of the invention may provide an electrical storage device electrode binder composition that makes it possible to produce an electrical storage device electrode that exhibits excellent adhesion and excellent charge-discharge characteristics.

Several aspects of the invention may provide an electrical storage device electrode binder composition that makes it possible to produce an electrical storage device electrode that exhibits excellent long-term storage stability, excellent adhesion, and excellent charge-discharge characteristics.

Solution to Problem

The invention was conceived in order to solve at least some of the above problems, and may be implemented as described below (see the following aspects and application examples).

Application Example 1

According to one aspect of the invention, an electrical storage device electrode binder composition is used to produce an electrode used for an electrical storage device, and includes a polymer (A) and a liquid medium (B), the polymer (A) including a repeating unit (A4) derived from an unsaturated carboxylic acid in an amount of 5 to 40 parts by mass based on 100 parts by mass of the total repeating units included in the polymer (A), the polymer (A) being polymer particles, and the polymer particles having a surface acid content of more than 1 mmol/g and 6 mmol/g or less.

Application Example 2

In the electrical storage device electrode binder composition according to Application Example 1, the polymer particles may have a zeta potential of −80 to −10 mV.

Application Example 3

In the electrical storage device electrode binder composition according to Application Example 1 or 2, the polymer (A) may include a repeating unit (A1) derived from a conjugated diene compound in an amount of 30 to 50 parts by mass, a repeating unit (A2) derived from an aromatic vinyl compound in an amount of 10 to 50 parts by mass, a repeating unit (A3) derived from a (meth)acrylate compound in an amount of 1 to 10 parts by mass, and a repeating unit (A5) derived from an alpha, beta-unsaturated nitrile compound in an amount of 1 to 10 parts by mass, based on 100 parts by mass of the total repeating units included in the polymer (A).

Application Example 4

In the electrical storage device electrode binder composition according to Application Example 3, the mass ratio "$W_{A4}/W_{A1}$" may be 0.3 to 1, and the mass ratio "$W_{A4}/W_{A5}$" may be 1.8 to 25, $W_{A1}$ being the mass of the repeating unit (A1), $W_{A4}$ being the mass of the repeating unit (A4), and $W_{A5}$ being the mass of the repeating unit (A5).

Application Example 5

In the electrical storage device electrode binder composition according to Application Example 3 or 4, the mass ratio "$W_{A2}/W_{A1}$" may be 0.3 to 1.5, $W_{A1}$ being the mass of the repeating unit (A1), and $W_{A2}$ being the mass of the repeating unit (A2).

Application Example 6

In the electrical storage device electrode binder composition according to any one of Application Examples 1 to 5, wherein the polymer (A) may include two or more repeating units derived from an unsaturated carboxylic acid as the repeating unit (A4).

Application Example 7

In the electrical storage device electrode binder composition according to any one of Application Examples 1 to 6, the polymer particles may have an average particle size of 50 to 400 nm.

Application Example 8

The electrical storage device electrode binder composition according to any one of Application Examples 1 to 7 may further include an isothiazoline-based compound (C).

Application Example 9

The electrical storage device electrode binder composition according to Application Example 8 may include the isothiazoline-based compound (C) at a concentration of 50 ppm or more and less than 200 ppm.

Application Example 10

In the electrical storage device electrode binder composition according to any one of Application Examples 1 to 9, the electrode may include a silicon material as an active material.

Application Example 11

According to another aspect of the invention, an electrical storage device electrode slurry includes the electrical storage device electrode binder composition according to any one of Application Examples 1 to 10, and an active material.

Application Example 12

The electrical storage device electrode slurry according to Application Example 11 may include a silicon material as the active material.

Application Example 13

The electrical storage device electrode slurry according to Application Example 11 or 12 may have a thread-forming capability of 30 to 80%.

Application Example 14

According to another aspect of the invention, an electrical storage device electrode includes a collector, and an active material layer that is formed by applying the electrical storage device electrode slurry according to any one of Application Examples 11 to 13 to the surface of the collector, and drying the applied electrical storage device electrode slurry.

Application Example 15

The electrical storage device electrode according to Application Example 14 may include silicon in an amount of 2 to 30 parts by mass based on 100 parts by mass of the active material layer.

Application Example 16

In the electrical storage device electrode according to Application Example 14 or 15, the active material layer may have a polymer distribution coefficient of 0.6 to 1.0.

Application Example 17

According to a further aspect of the invention, an electrical storage device includes the electrical storage device electrode according to any one of Application Examples 14 to 16.

Advantageous Effects of the Invention

The electrical storage device electrode binder composition according to one aspect of the invention makes it possible to produce an electrical storage device electrode that exhibits excellent adhesion and excellent charge-discharge characteristics. The electrical storage device electrode binder composition according to one aspect of the invention also makes it possible to produce an electrical storage device electrode that exhibits excellent long-term storage stability, excellent adhesion, and excellent charge-discharge characteristics. In particular, the electrical storage device electrode binder composition according to one aspect of the invention achieves the above advantageous effects when the electrical storage device electrode includes an active material having a high lithium occlusion capacity (e.g., carbon material (e.g., graphite) or silicon material).

The electrical storage device electrode according to one aspect of the invention exhibits excellent fall-off resistance and excellent electrical characteristics while ensuring that the collector and the silicon-containing active material layer exhibit excellent adhesion to each other. The electrical storage device that includes the electrical storage device electrode exhibits excellent charge-discharge rate characteristics (i.e., electrical characteristics).

BRIEF DESCRIPTION OF DRAWINGS

FIG. 1 is a cross-sectional view schematically illustrating an electrical storage device electrode according to one embodiment of the invention.

DESCRIPTION OF EMBODIMENTS

Exemplary embodiments of the invention are described in detail below. Note that the invention is not limited to the following exemplary embodiments. It is intended that the invention includes various modifications that can be practiced without departing from the scope of the invention. The term "(meth)acrylic acid" used herein refers to "acrylic acid" and "methacrylic acid". The term "(meth)acrylate" used herein refers to "acrylate" and "methacrylate".

1. Electrical Storage Device Electrode Binder Composition

An electrical storage device electrode binder composition (hereinafter may be referred to as "binder composition") according to one embodiment of the invention is used to produce an electrode used for an electrical storage device, and includes a polymer (A) and a liquid medium (B). Each component included in the binder composition according to one embodiment of the invention is described in detail below.

1.1. Polymer (A)

The polymer (A) included in the binder composition according to one embodiment of the invention is polymer particles that are dispersed in the liquid medium (B) (i.e., latex). When the polymer (A) is polymer particles, an electrical storage device electrode slurry (hereinafter may be referred to as "slurry") prepared by mixing the binder composition with an active material exhibits excellent stability and excellent applicability to a collector.

The surface acid content of the polymer particles included in the binder composition according to one embodiment of the invention is more than 1 mmol/g and 6 mmol/g or less, preferably 1.5 to 5.5 mmol/g, and more preferably 2 to 5.5 mmol/g. When the surface acid content of the polymer particles is within the above range, it is possible to prepare a stable and homogeneous electrical storage device electrode slurry. An active material layer formed using such a homogeneous slurry has a configuration in which the active material and the polymer particles are uniformly dispersed, and shows only a small variation in thickness. Therefore, a variation in charge-discharge characteristics within the electrode can be suppressed, and an electrical storage device that exhibits excellent charge-discharge characteristics can be obtained.

On the other hand, when a slurry is prepared using polymer particles having a surface acid content that does not fall within the above range, it may be difficult to uniformly disperse the active material and the polymer particles, and aggregation may occur. An active material layer formed using a slurry in which aggregation occurs does not have a homogeneous material composition. When a charge-discharge operation is performed in a state in which the active material layer has such an inhomogeneous material composition, an excessive voltage may be locally applied to the inhomogeneous part, and the inhomogeneous part may deteriorate, for example. As a result, the charge-discharge characteristics may rapidly deteriorate due to repeated charge-discharge operations.

The mechanism by which aggregation in the slurry can be suppressed when the surface acid content of the polymer particles included in the binder composition according to one embodiment of the invention is within the above range is not clear. It is conjectured that aggregation in the slurry can be suppressed since adsorption of a carbon material or a silicon material used as an active material (particularly a negative electrode active material) on the surface of the polymer particles is moderately controlled. For example, a functional group such as C—OH or C=O is present on the surface of a carbon material, and a functional group such as Si—OH is present on the surface of a silicon material. Such a functional group is easily bonded via a hydrogen bond to a carboxyl group included in a repeating unit (A4) derived from an unsaturated carboxylic acid that is present on the surface of the polymer particles. When the hydrogen bond is too strong (i.e., when the surface acid content of the polymer particles exceeds the above range), the polymer particles and the active material particles tend to easily aggregate. As a result, the thread-forming capability of the slurry deteriorates, and it is difficult to form a uniform film for forming the active material layer on the surface of the collector. This makes it difficult to produce an electrical storage device that exhibits excellent charge-discharge characteristics. Specifically, since moderate interaction occurs when the surface acid content of the polymer particles is within the above range, it is possible to prepare a slurry that exhibits an appropriate thread-forming capability, and produce an electrical storage device that exhibits excellent charge-discharge characteristics.

It is also considered that the surface acid content of the polymer particles is an index of affinity to ions. Specifically, when the surface acid content of the polymer particles is less than the above range, it is considered that the polymer particles exhibits low affinity to ions (e.g., lithium ions) that take part in charge transfer during charge and discharge, and the resistance of the electrode increases. It is considered that the polymer particles exhibits moderate affinity to ions (e.g., lithium ions) that take part in charge transfer when the surface acid content of the polymer particles is within the above range, and it is possible to produce an electrical storage device that exhibits excellent charge-discharge characteristics.

The surface acid content of the polymer particles may be affected by the monomer composition of the polymer (A). Note that the surface acid content of the polymer particles is not determined by only the monomer composition. Specifically, it is known that the surface acid content of polymer particles changes depending on the polymerization conditions and the like even if the monomer composition is identical. The examples of the present application illustrate mere examples of such a phenomenon.

For example, the amount of carboxylic acid derived from an unsaturated carboxylic acid that is exposed on the surface of the resulting polymer particles differs between the case where the entirety of the unsaturated carboxylic acid is initially added to the polymerization solution, and an additional monomer is sequentially added to the polymerization solution, and the case where a monomer other than the unsaturated carboxylic acid is initially added to the polymerization solution, and the unsaturated carboxylic acid is then added to the polymerization solution, even if the monomer composition is identical. It is considered that the surface acid content of the polymer particles varies to a large extent even when only the order in which the monomers are added is changed.

Note that the surface acid content of the polymer particles refers to a value obtained by measuring the potential difference using a potentiometric titration device that utilizes a difference in electrical conductivity as the measurement principle, and calculating the surface acid content from the sulfuric acid content determined by titration. Examples of such a potentiometric titration device include AT and AT-610 (manufactured by Kyoto Electronics Manufacturing Co., Ltd.); and the like.

The zeta potential of the polymer particles included in the binder composition according to one embodiment of the invention is preferably −80 to −10 mV, more preferably −75 to −25 mV, and particularly preferably −65 to −20 mV. When the zeta potential of the polymer particles is within the above range, it is possible to prepare a more stable and homogeneous electrical storage device electrode slurry. An active material layer formed using such a homogeneous slurry has a configuration in which the active material and the polymer particles are uniformly dispersed, and shows only a small variation in thickness. Therefore, a variation in charge-discharge characteristics within the electrode can be suppressed, and an electrical storage device that exhibits more excellent charge-discharge characteristics can be obtained.

The zeta potential of the polymer particles may be affected by the monomer composition of the polymer (A). Note that the zeta potential of the polymer particles is not determined by only the monomer composition. Specifically, it is known that the zeta potential of polymer particles varies depending on the pH of the binder composition, and an additive and impurities included in the binder composition, even if the monomer composition is identical. The pH of the binder composition according to one embodiment of the invention is preferably 4 to 10, and more preferably 5 to 8, from the viewpoint of ensuring the dispersion stability of the polymer particles and the active material (particularly a carbon material or a silicon material).

The zeta potential of the polymer particles may be measured using a zeta potential measurement device that utilizes a laser Doppler method as the measurement principle. Examples of such a zeta potential measurement device include a zeta potential analyzer (manufactured by Brookhaven Instruments Corporation), and the like.

The polymer (A) includes the repeating unit (A4) derived from an unsaturated carboxylic acid in an amount of 5 to 40 parts by mass based on 100 parts by mass of the total repeating units included in the polymer (A). As a result, an acidic functional group such as a carboxyl group is present on the surface of the polymer particles. It is preferable that the polymer (A) include a repeating unit (A1) derived from a conjugated diene compound, a repeating unit (A2) derived from an aromatic vinyl compound, a repeating unit (A3) derived from a (meth)acrylate compound, and a repeating unit (A5) derived from an alpha,beta-unsaturated nitrile compound. Each repeating unit included in the polymer (A) is described in detail below.

1.1.1. Repeating Unit (A4) Derived from Unsaturated Carboxylic Acid

When the polymer (A) includes the repeating unit (A4) derived from an unsaturated carboxylic acid (hereinafter may be referred to as "repeating unit (A4)"), it is possible to prepare a slurry in which the active material is well dispersed without undergoing aggregation. Therefore, an active material layer formed by applying and drying the slurry has an almost uniform distribution, and it is possible to produce an electrical storage device electrode in which the number of binding/bonding defects is very small. Specifically, it is possible to remarkably improve the adhesion of the active material, and the adhesion between the active material layer and the collector. Since the dispersion stability of the active material is improved, the storage stability of the slurry is improved.

Specific examples of the unsaturated carboxylic acid include monocarboxylic acids and dicarboxylic acids such as acrylic acid, methacrylic acid, crotonic acid, maleic acid, fumaric acid, and itaconic acid. The unsaturated carboxylic acid may be one or more compounds selected from these compounds. It is preferable that the polymer (A) include two or more types of the repeating unit (A4) derived from unsaturated carboxylic acid. It is more preferable that the polymer (A) include one or more monocarboxylic acids (e.g., acrylic acid and methacrylic acid), and one or more dicarboxylic acids (e.g. fumaric acid and itaconic acid) in combination. A monocarboxylic acid improves the effect of improving the binding capability of the active material that includes a silicon material, and a dicarboxylic acid improves the effect of improving of the adhesion between the active material layer and the collector. Therefore, the adhesion of the polymer (A) can be significantly improved by utilizing a monocarboxylic acid and a dicarboxylic acid in combination.

The polymer (A) preferably includes the repeating unit (A4) derived from an unsaturated carboxylic acid in an amount of 5 to 40 parts by mass, more preferably 10 to 40 parts by mass, still more preferably 15 to 35 parts by mass, and particularly preferably 16 to 30 parts by mass, based on 100 parts by mass of the total repeating units included in the polymer (A). When the polymer (A) includes the repeating unit (A4) in an amount within the above range, it is possible to improve the binding capability of the active material having a surface polar functional group (e.g., an active material that includes a silicon material), and improve the adhesion between the active material layer and the collector. Since the active material exhibits excellent dispersion stability when preparing a slurry, aggregates are rarely formed, and an increase in viscosity of the slurry with the passage of time can be suppressed.

If the polymer (A) includes the repeating unit (A4) in an amount less than the above range, the binding capability of the active material and the adhesion between the active material layer and the collector may be insufficient when using a binder composition that includes the polymer (A), and the capability to follow a change in volume (e.g., contraction and expansion) of the active material may deteriorate. As a result, the active material may be removed due to repeated charge and discharge, or cracks may occur in the active material layer (i.e., a deterioration in electrode may occur). Since the resulting polymer may easily aggregate, the binder composition may exhibit poor storage stability. If the polymer (A) includes the repeating unit (A4) in an amount more than the above range, the viscosity of the binder composition may significantly increase. In this case, since the viscosity of the slurry prepared using the binder composition also significantly increases, it may be difficult to form a homogeneous active material layer. As a result, an excessive voltage may be applied to the inhomogeneous part of the active material layer (i.e., the active material layer may deteriorate), and the charge-discharge characteristics may deteriorate.

1.1.2. Repeating Unit (A1) Derived from Conjugated Diene Compound

When the polymer (A) includes the repeating unit (A1) derived from a conjugated diene compound (hereinafter may be referred to as "repeating unit (A1)"), it is possible to easily prepare a binder composition that exhibits excellent viscoelasticity and strength. Specifically, a polymer that includes a repeating unit derived from a conjugated diene compound exhibits a high binding capability. Since the rubber elasticity derived from the conjugated diene compound is provided to the polymer, the polymer can follow a change in volume (e.g., contraction and expansion) of the active material that includes a carbon material (e.g., graphite) or a silicon material. It is thus possible to further improve adhesion, and improve durability that maintains the charge-discharge characteristics for a long time.

Examples of the conjugated diene compound include 1,3-butadiene, 2-methyl-1,3-butadiene, 2,3-dimethyl-1,3-butadiene, 2-chloro-1,3-butadiene, substituted linear conjugated pentadienes, substituted side-chain conjugated hexadienes, and the like. The conjugated diene compound may be one or more compounds selected from these compounds. It is particularly preferable to use 1,3-butadiene as the conjugated diene compound.

The polymer (A) preferably includes the repeating unit (A1) derived from a conjugated diene compound in an amount of 30 to 50 parts by mass, more preferably 32 to 48 parts by mass, and particularly preferably 35 to 48 parts by mass, based on 100 parts by mass of the total repeating units included in the polymer (A). When the polymer (A) includes the repeating unit (A1) in an amount within the above range, it is possible to easily prepare a binder composition that exhibits excellent viscoelasticity and strength.

When the mass of the repeating unit (A1) derived from a conjugated diene compound included in the polymer (A) is referred to as $W_{A1}$, and the mass of the repeating unit (A4) derived from an unsaturated carboxylic acid included in the polymer (A) is referred to as $W_{A4}$, it is preferable that the mass ratio "$W_{A4}/W_{A1}$" be 0.3 to 1, more preferably 0.32 to 0.9, and particularly preferably 0.35 to 0.8. When the mass ratio "$W_{A4}/W_{A1}$" is within the above range, it is possible to improve the binding capability of the active material having a surface polar functional group (e.g., an active material that includes a carbon material (e.g., graphite) or a silicon material), and improve the adhesion between the active material layer and the collector in a well-balanced manner.

1.1.3. Repeating Unit (A2) Derived from Aromatic Vinyl Compound

When the polymer (A) includes the repeating unit (A2) derived from an aromatic vinyl compound (hereinafter may be referred to as "repeating unit (A2)"), the polymer (A) has a moderate glass transition temperature (Tg). Therefore, the resulting active material layer exhibits moderate flexibility, and the adhesion between the collector and the active material layer is improved.

Specific examples of the aromatic vinyl compound include styrene, alpha-methylstyrene, p-methylstyrene, vinyltoluene, chlorostyrene, divinylbenzene, and the like. The aromatic vinyl compound may be one or more compounds selected from these compounds. It is particularly preferable to use styrene as the aromatic vinyl compound.

The polymer (A) preferably includes the repeating unit (A2) derived from an aromatic vinyl compound in an amount of 10 to 50 parts by mass, more preferably 15 to 45 parts by mass, and particularly preferably 20 to 40 parts by mass, based on 100 parts by mass of the total repeating units included in the polymer (A). When the polymer (A) includes the repeating unit (A2) in an amount within the above range, the polymer (A) has a moderate glass transition temperature (Tg). This makes it possible to improve the binding capability of the active material that includes a carbon material (e.g., graphite) or a silicon material. Moreover, the resulting active material layer exhibits higher flexibility and adhesion to the collector.

When the mass of the repeating unit (A1) derived from a conjugated diene compound included in the polymer (A) is referred to as $W_{A1}$, and the mass of the repeating unit (A2) derived from an aromatic vinyl compound included in the polymer (A) is referred to as $W_{A2}$, it is preferable that the mass ratio "$W_{A2}/W_{A1}$" be 0.3 to 1.5, more preferably 0.32 to 1.2, and particularly preferably 0.34 to 1.0. When the mass ratio "$W_{A2}/W_{A1}$" is within the above range, the hydrophobic component included in the polymer (A) exhibits moderate thermoplasticity, and the resulting active material layer exhibits more excellent adhesion due to fusion of the polymer when drying the electrode by heating (particularly when using a carbon material (e.g., graphite) as the active material).

1.1.4. Repeating Unit (A3) Derived from (Meth)Acrylate Compound

When the polymer (A) includes the repeating unit (A3) derived from a (meth)acrylate compound (hereinafter may be referred to as "repeating unit (A3)"), the polymer (A) exhibits high affinity to the electrolyte solution, and it is possible to suppress an increase in internal resistance that may occur when the polymer (A) serves as an electrical resistance component in the electrical storage device, and prevent a decrease in adhesion due to excessive absorption of the electrolyte solution.

When the polymer (A) includes the repeating unit (A5) derived from an alpha,beta-unsaturated nitrile compound (hereinafter may be referred to as "repeating unit (A5)"), the polymer (A) exhibits a high swelling ratio with respect to the electrolyte solution, and the resistance of the electrode decreases. However, the adhesion of the active material, and the adhesion between the active material layer and the collector may decrease (i.e., the electrode structure may not be sufficiently maintained), and the charge-discharge characteristics may deteriorate. When the polymer (A) includes the repeating unit (A3) and the repeating unit (A5) in combination, the polymer (A) exhibits a high swelling ratio with respect to the electrolyte solution, the resistance of the electrode decreases, and the adhesion of the active material, and the adhesion between the active material layer and the collector can be improved (i.e., the electrode structure can be sufficiently maintained) due to the synergistic effect of the repeating unit (A3) and the repeating unit (A5).

Specific examples of the (meth)acrylate compound include methyl (meth)acrylate, ethyl (meth)acrylate, n-propyl (meth)acrylate, i-propyl (meth)acrylate, n-butyl (meth)acrylate, i-butyl (meth)acrylate, n-amyl (meth)acrylate, i-amyl (meth)acrylate, hexyl (meth)acrylate, cyclohexyl (meth)acrylate, 2-ethylhexyl (meth)acrylate, octyl (meth)acrylate, nonyl (meth)acrylate, decyl (meth)acrylate, ethylene glycol di(meth)acrylate, propylene glycol di(meth)acrylate, trimethylolpropane tri(meth)acrylate, pentaerythritol tetra(meth)acrylate, dipentaerythritol hexa(meth)acrylate, allyl (meth)acrylate, ethylene di(meth)acrylate, and the like. The (meth)acrylate compound may be one or more compounds selected from these compounds.

Further examples of the (meth)acrylate compound include a compound represented by the following general formula (1).

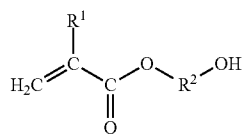

(1)

wherein $R^1$ is a hydrogen atom or a monovalent hydrocarbon group, preferably a monovalent hydrocarbon group, more preferably a substituted or unsubstituted alkyl group having 1 to 6 carbon atoms, and particularly preferably a methyl group. $R^2$ is a divalent hydrocarbon group, and preferably a methylene group or a substituted or unsubstituted alkylene group having 2 to 6 carbon atoms. Specific examples of the compound represented by the general formula (1) include hydroxymethyl (meth)acrylate, hydroxyethyl (meth)acrylate, hydroxypropyl (meth)acrylate, hydroxybutyl (meth)acrylate, hydroxypentyl (meth)acrylate, hydroxyhexyl (meth)acrylate, and the like.

It is preferable to use one or more compounds selected from methyl (meth)acrylate, ethyl (meth)acrylate, 2-ethylhexyl (meth)acrylate, hydroxymethyl (meth)acrylate, and hydroxyethyl (meth)acrylate, as the (meth)acrylate compound. It is particularly preferable to use methyl (meth)acrylate, hydroxymethyl (meth)acrylate, and/or hydroxyethyl (meth)acrylate. Note that these (meth)acrylate compounds may be used either alone or in combination.

The polymer (A) preferably includes the repeating unit (A3) derived from a (meth)acrylate compound in an amount of 1 to 10 parts by mass, more preferably 2 to 10 parts by mass, and particularly preferably 3 to 9 parts by mass, based on 100 parts by mass of the total repeating units included in the polymer (A). When the polymer (A) includes the repeating unit (A3) in an amount within the above range, the polymer (A) exhibits moderate affinity to the electrolyte solution. This makes it possible to suppress an increase in internal resistance that may occur when the polymer (A) serves as an electrical resistance component in the electrical storage device. It is also possible to prevent a decrease in adhesion due to excessive absorption of the electrolyte solution.

1.1.5. Repeating Unit (A5) Derived from Alpha,Beta-Unsaturated Nitrile Compound When the polymer (A) includes the repeating unit (A5) derived from an alpha,beta-unsaturated nitrile compound, the polymer (A) moderately swells in the electrolyte solution (described later). Specifically, since the electrolyte solution enters the network structure formed by the polymer chains due to the presence of a nitrile group, and the internetwork space increases, solvated lithium ions easily pass through the network structure. It is considered that the diffusion capability of lithium ions is thus improved. As a result, the electrode exhibits excellent charge-discharge characteristics due to a decrease in resistance.

Specific examples of the alpha,beta-unsaturated nitrile compound include acrylonitrile, methacrylonitrile, alpha-chloroacrylonitrile, alpha-ethylacrylonitrile, vinylidene cyanide, and the like. The alpha,beta-unsaturated nitrile compound may be one or more compounds selected from these compounds. It is preferable to use one or more compounds selected from acrylonitrile and methacrylonitrile as the alpha,beta-unsaturated nitrile compound. It is more preferable to use acrylonitrile as the alpha,beta-unsaturated nitrile compound.

The polymer (A) preferably includes the repeating unit (A5) derived from an alpha,beta-unsaturated nitrile compound in an amount of 1 to 10 parts by mass, more preferably 2 to 10 parts by mass, and particularly preferably 3 to 9 parts by mass, based on 100 parts by mass of the total repeating units included in the polymer (A). When the polymer (A) includes the repeating unit (A5) derived from an alpha,beta-unsaturated nitrile compound in an amount within the above range, the polymer (A) exhibits excellent affinity to the electrolyte solution, and exhibits more excellent adhesion and strength. It is also possible to prepare a binder composition that exhibits mechanical characteristics and electrical characteristics in a well-balanced manner.

When the mass of the repeating unit (A4) derived from an unsaturated carboxylic acid included in the polymer (A) is referred to as $W_{A4}$, and the mass of the repeating unit (A5) derived from an alpha,beta-unsaturated nitrile compound included in the polymer (A) is referred to as $W_{A5}$, it is preferable that the mass ratio "$W_{A4}/W_{A5}$" be 1.8 to 25, more preferably 2 to 20, and particularly preferably 3 to 15. When the mass ratio "$W_{A4}/W_{A5}$" is within the above range, the polymer (A) exhibits adhesion and affinity to the electrolyte solution in a well-balanced manner, and the charge capacity and the charge-discharge rate characteristics of the electrical storage device are synergistically improved.

In particular, when producing the negative electrode using a mixture of a silicon material and a carbon material (described later) as the active material, it is possible to effectively bind the active material, effectively reduce the effects of a change in volume of the active material due to charge and discharge (due to the silicon material), and further improve the adhesion between the active material layer and the collector when mass ratio "$W_{A4}/W_{A1}$" and the mass ratio "$W_{A4}/W_{A5}$" are within the above ranges. As a result, the charge capacity and the charge-discharge rate characteristics of the electrical storage device are synergistically improved.

1.1.6. Additional Repeating Unit

The polymer (A) included in the binder composition according to one embodiment of the invention may include a repeating unit derived from a monomer copolymerizable with the above compounds in addition to the above repeating units.

Examples of the monomer copolymerizable with the above compounds include fluorine-containing compounds that include an ethylenically unsaturated bond, such as vinylidene fluoride, tetrafluoroethylene, and hexafluoropropylene; alkylamides of an ethylenically unsaturated carboxylic acid, such as (meth)acrylamide and N-methylolacrylamide; vinyl carboxylates such as vinyl acetate and vinyl propionate; ethylenically unsaturated dicarboxylic anhydrides; aminoalkylamides of an ethylenically unsaturated carboxylic acid, such as aminoethylacrylamide, dimethylaminomethylmethacrylamide, and methylaminopropylmethacrylamide; and the like. The monomer may be one or more compounds selected from these compounds.

1.1.7. Method for Synthesizing Polymer (A)

The polymer (A) may be synthesized using an arbitrary method. For example, the polymer (A) may be synthesized using an emulsion polymerization method in the presence of a known emulsifier (surfactant), initiator, molecular weight modifier, and the like.

Specific examples of the emulsifier include anionic surfactants such as higher alcohol sulfate salts, alkylbenzenesulfonates, alkyl diphenyl ether disulfonates, aliphatic sulfonates, aliphatic carboxylates, dehydroabietates, a naphthalenesulfonic acid-formalin condensate, and sulfate salts of a nonionic surfactant; nonionic surfactants such as polyethylene glycol alkyl esters, polyethylene glycol alkyl phenyl ethers, and polyethylene glycol alkyl ethers; fluorine-containing surfactants such as perfluorobutylsulfonates, perfluoroalkyl group-containing phosphates, perfluoroalkyl group-containing carboxylates, and perfluoroalkyl ethylene oxide adducts; and the like. The emulsifier may be one or more compounds selected from these compounds.

Specific examples of the molecular weight modifier include alkylmercaptans such as n-hexylmercaptan, n-octylmercaptan, t-octylmercaptan, n-dodecylmercaptan, t-dodecylmercaptan, and n-stearylmercaptan; xanthogen compounds such as dimethylxanthogen disulfide and diisopropylxanthogen disulfide; thiuram compounds such as terpinolene, tetramethylthiuram disulfide, tetraethylthiuram disulfide, and tetramethylthiuram monosulfide; phenol compounds such as 2,6-di-t-butyl-4-methylphenol and styrenated phenol; allyl compounds such as allyl alcohols; halogenated hydrocarbon compounds such as dichloromethane, dibromomethane, and carbon tetrabromide; vinyl ether compounds such as alpha-benzyloxystyrene, alpha-benzyloxyacrylonitrile, and alpha-benzyloxyacrylamide; triphenylethane; pentaphenylethane; acrolein; methacrolein; thioglycolic acid; thiomalic acid; 2-ethylhexyl thioglycolate; an alpha-methylstyrene dimer; and the like. The molecular weight modifier may be one or more compounds selected from these compounds.

Specific examples of the initiator include water-soluble initiators such as lithium persulfate, potassium persulfate, sodium persulfate, and ammonium persulfate; oil-soluble initiators such as cumene hydroperoxide, benzoyl peroxide, t-butyl hydroperoxide, acetyl peroxide, diisopropylbenzene hydroperoxide, 1,1,3,3-tetramethylbutyl hydroperoxide, azobisisobutyronitrile, and 1,1'-azobis(cyclohexanecarbonitrile); and the like. These compounds may be appropriately used as the initiator. It is particularly preferable to use potassium persulfate, sodium persulfate, cumene hydroperoxide, or t-butyl hydroperoxide. It is also preferable to use a redox initiator obtained by combining an oxidizing agent and a reducing agent (e.g., persulfate and sodium bisulfite). The initiator is used in an appropriate amount taking account of the monomer composition, the pH of the polymerization system, the type of additional additive, and the like.

The polymer (A) may be synthesized by one-step polymerization, or may be synthesized by two-step polymerization.

When synthesizing the polymer (A) by one-step polymerization, the polymer (A) may be synthesized by subjecting the monomer mixture to emulsion polymerization preferably at 40 to 80° C. for 4 to 12 hours in the presence of an appropriate emulsifier, initiator, molecular weight modifier, and the like.

When synthesizing the polymer (A) by two-step polymerization, the polymerization conditions in each step are preferably set as described below.

The ratio of the monomer(s) used for first-step polymerization is preferably 5 to 50 mass %, and more preferably 10 to 40 mass %, based on the total mass of the monomer(s) (i.e., the total of the mass of the monomer(s) used for first-step polymerization and the mass of the monomer(s) used for second-step polymerization). When the ratio of the monomer(s) used for first-step polymerization is within the above range, it is possible to obtain particles of the polymer (A) that exhibit excellent dispersion stability and rarely aggregate. It is also possible to suppress an increase in viscosity of the binder composition with the passage of time.

The type and the ratio of the monomer(s) used for first-step polymerization, and the type and the ratio of the monomer(s) used for second-step polymerization, may be either identical or different. When using a monomer having high reactivity with a diene-based monomer such as an alpha,beta-unsaturated nitrile compound, the heat of reaction may be generated at one time due to the rapid progress of the polymerization reaction, and it may be difficult to control the polymerization temperature. Therefore, it is preferable to subject 60 mass % or more, and more preferably 80 mass % or more of the monomer(s) to second-step polymerization in order to more stably control the polymerization temperature.

The polymerization conditions in each step are preferably set as described below from the viewpoint of the dispersibility of the resulting polymer.
First-step polymerization: temperature: preferably 40 to 80° C., polymerization time: preferably 2 to 4 hours, polymerization conversion rate: preferably 50 mass % or more, and more preferably 60 mass % or more
Second-step polymerization: temperature: preferably 40 to 80° C., polymerization time: preferably 2 to 6 hours When the total solid content during emulsion polymerization is 50 mass % or less, the polymerization reaction proceeds so that the resulting polymer exhibits excellent dispersion stability. The total solid content is preferably 45 mass % or less, and more preferably 40 mass % or less.

When synthesizing the polymer (A) by one-step polymerization or two-step polymerization, it is preferable to adjust the pH of the polymerization mixture to about 5 to 10 after completion of emulsion polymerization by adding a neutralizer to the polymerization mixture. It is more preferable to adjust the pH of the polymerization mixture to 5 to 9, and particularly preferably 5 to 8. The neutralizer is not particularly limited. Examples of the neutralizer include metal hydroxides (e.g., sodium hydroxide and potassium hydroxide), ammonia, and the like. The dispersion stability of the polymer (A) is improved by setting the pH of the polymerization mixture within the above range. The neutralized polymerization mixture may be concentrated to increase the solid content in the polymerization mixture while maintaining the stability of the polymer (A).

1.1.8. Properties of Polymer (A)

1.1.8.1. Tetrahydrofuran (THF) Insoluble Content

The THF insoluble content in the polymer (A) is preferably 80 mass % or more, and more preferably 90 mass % or more. It was experimentally confirmed that the THF insoluble content is almost proportional to the content of components that are insoluble in the electrolyte solution used for the electrical storage device. Therefore, when an electrical storage device is produced using the polymer (A) having a THF insoluble content within the above range, elution of the polymer (A) into the electrolyte solution can be suppressed even when the electrical storage device is repeatedly charged and discharged for a long time.

1.1.8.2. Glass Transition Temperature (Tg)

It is preferable that the polymer (A) have only one endothermic peak within the temperature range of −40 to +25° C. when subjected to differential scanning calorimetry (DSC) in accordance with JIS K 7121. It is more preferable that the polymer (A) have the only one endothermic peak (i.e., glass transition temperature (Tg)) within the temperature range of −30 to +20° C., and still more preferably −25 to +10° C. When the polymer (A) has only one endothermic peak within the above temperature range when subjected to DSC, the polymer (A) exhibits excellent adhesion, and can provide the active material layer with more excellent flexibility and adhesion.

1.1.8.3. Average Particle Size

The average particle size of the polymer particles (polymer (A)) dispersed in the liquid medium (B) is preferably 50 to 400 nm, and more preferably 100 to 250 nm. When the average particle size of the polymer particles is within the above range, the polymer particles are sufficiently adsorbed on the surface of the active material, and easily move to follow the movement of the active material. This makes it possible to suppress migration of the polymer particles or the active material particles, and prevent a deterioration in electrical characteristics of the electrode.

The average particle size of the polymer particles refers to the particle size (D50) at 50% in the cumulative particle size distribution (in which the light scattering intensity is sequentially accumulated from particles having a small particle size to particles having a large particle size) measured using a particle size distribution analyzer that utilizes a dynamic light scattering method as the measurement principle. Examples of such a particle size distribution analyzer include HORIBA LA-550 and HORIBA SZ-100 (manufactured by Horiba, Ltd.); FPAR-1000 (manufactured by Otsuka Electronics Co., Ltd.); and the like. These particle size distribution analyzers can measure the particle size distribution of the primary particles of the polymer, and the particle size distribution of the secondary particles that are formed by aggregation of the primary particles. Therefore, the particle size distribution measured by these particle size distribution analyzers can be used as an index of the dispersion state of the polymer included in the binder composition. Note that the average particle size of the polymer particles may also be measured by centrifuging the slurry to precipitate the active material, and analyzing the supernatant liquid using the particle size distribution analyzer.

1.2. Liquid Medium (B)

The binder composition according to one embodiment of the invention includes the liquid medium (B). The liquid medium (B) is preferably an aqueous medium that includes water. The aqueous medium may include a non-aqueous medium other than water. Examples of the non-aqueous medium include amide compounds, hydrocarbons, alcohols, ketones, esters, amine compounds, lactones, sulfoxides, sulfone compounds, and the like. The non-aqueous medium may be one or more compounds selected from these compounds. When the aqueous medium is used as the liquid medium (B), the binder composition according to one embodiment of the invention has a low impact on the environment, and is highly safety for the operator.

The aqueous medium preferably includes the non-aqueous medium in an amount of 10 parts by mass or less, and more preferably 5 parts by mass or less based on 100 parts by mass of the aqueous medium. It is particularly preferable that the aqueous medium substantially does not include the non-aqueous medium. The expression "substantially does not include" used herein in connection with the non-aqueous medium means that the non-aqueous medium is not intentionally added as the liquid medium. Therefore, the liquid medium (B) may include a non-aqueous medium that is inevitably mixed in the liquid medium (B) when preparing the binder composition.

1.3. Isothiazoline-Based Compound (C)

It is preferable that the binder composition according to one embodiment of the invention include an isothiazoline-based compound (C). When the binder composition includes the isothiazoline-based compound (C), the isothiazoline-based compound (C) functions as a preservative, and suppresses a situation in which bacteria, mold, and the like grow in the binder composition during storage to produce a foreign substance. Moreover, since a deterioration in the binder is suppressed when charging and discharging the electrical storage device, a deterioration in charge-discharge characteristics of the electrical storage device can be suppressed.

It is conjectured that a deterioration in the binder is suppressed by the following mechanism when charging and discharging the electrical storage device. Since the isothiazoline-based compound (C) and the polymer (A) exhibit high affinity to each other, it is considered that the isothiazoline-based compound (C) is retained by the polymer (A) that functions as a binder through adsorption or the like, and is rarely eluted from the active material layer into the electrolyte solution even when the active material layer is immersed in the electrolyte solution. When the isothiazoline-based compound (C) is retained by the polymer (A), a deterioration in the polymer (A) (that functions as a binder) due to the electrolyte solution is suppressed, and a deterioration in the electrolyte solution is also suppressed. It is considered that a deterioration in charge-discharge characteristics is thus prevented.

When an additional component is added to a polymer particle dispersion (e.g., latex), the additional component tends to trigger aggregation. However, since the isothiazoline-based compound (C) affects the dispersibility of the polymer particles to only a small extent, occurrence of aggregates can be suppressed. Specifically, since a component that triggers aggregation is absent when mixing the binder composition and the active material to prepare a slurry, it is possible to suppress aggregation of the polymer particles and the active material. Therefore, it is possible to produce an electrode in which a homogeneous active material layer is formed on the surface of the collector, and further improve the charge-discharge characteristics of the electrical storage device.

The concentration of the isothiazoline-based compound (C) in the binder composition is preferably 50 ppm or more and less than 200 ppm, and more preferably 50 to 150 ppm. When the concentration of the isothiazoline-based compound (C) in the binder composition is within the above range, the long-term storage stability of the binder composition is improved. Moreover, an electrical storage device that includes an electrode produced by applying a slurry prepared using the binder composition to a collector, and drying the applied slurry exhibits more excellent charge-discharge characteristics.

When the concentration of the isothiazoline-based compound (C) is within the above range, it is also possible to improve the fluidity of the slurry. It is possible to form an active material layer having a more uniform thickness by improving the fluidity of the slurry, and a voltage is uniformly applied to the entire active material layer even when a charge-discharge operation is performed at a high rate. This makes it possible to implement stable charge-discharge characteristics.

The isothiazoline-based compound (C) that may be included in the binder composition according to one embodiment of the invention is not particularly limited as long as the isothiazoline-based compound (C) is a compound that has an isothiazoline skeleton. Examples of the isothiazoline-based compound (C) include a compound represented by the following general formula (2) and a compound represented by the following general formula (3).

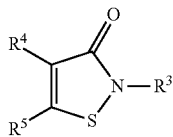

(2)

wherein $R^3$ is a hydrogen atom or a hydrocarbon group, and $R^4$ and $R^5$ are independently a hydrogen atom, a halogen atom, or a hydrocarbon group. When $R^3$, $R^4$, and $R^5$ are a hydrocarbon group, the hydrocarbon group may have a chain-like (linear or branched) carbon skeleton, or may have a cyclic carbon skeleton. The number of carbon atoms of the hydrocarbon group is preferably 1 to 10, and more preferably 1 to 8. Specific examples of such a hydrocarbon group include a methyl group, an ethyl group, a propyl group, an isopropyl group, a butyl group, a hexyl group, a cyclohexyl group, an octyl group, a 2-ethylhexyl group, and the like.

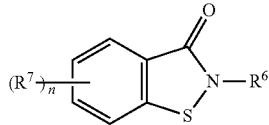

(3)

wherein $R^6$ is a hydrogen atom or a hydrocarbon group, and $R^7$ is (independently) a hydrogen atom or an organic group. When $R^6$ is a hydrocarbon group, the hydrocarbon group may be any of the hydrocarbon groups described above in connection with the general formula (2). When $R^7$ is an organic group, the organic group may be an aliphatic group or an alicyclic group (e.g., alkyl group or cycloalkyl group). It is preferable that the organic group be an aliphatic group. The number of carbon atoms of the aliphatic group is preferably 1 to 12, more preferably 1 to 10, and particularly preferably 1 to 8. The aliphatic group and the alicyclic group may be substituted with a halogen atom, an alkoxy group, a dialkylamino group, an acyl group, an alkoxycarbonyl group, or the like. Specific examples of the aliphatic group include a methyl group, an ethyl group, a propyl group, an isopropyl group, a butyl group, a hexyl group, a cyclohexyl group, an octyl group, a 2-ethylhexyl group, and the like. n is an integer from 0 to 4.

Specific examples of the isothiazoline-based compound (C) that may be included in the binder composition according to one embodiment of the invention include 1,2-benzisothiazolin-3-one, 2-methyl-4,5-trimethylene-4-isothiazolin-3-one, 2-methyl-4-isothiazolin-3-one, 5-chloro-2-methyl-4-isothiazolin-3-one, N-n-butyl-1,2-benzisothiazolin-3-one, 2-n-octyl-4-isothiazolin-3-one, 4,5-dichloro-2-n-octyl-4-isothiazolin-3-one, and the like. The isothiazo line-based compound (C) may be one or more compounds selected from these compounds. It is preferable that the isothiazoline-based compound (C) be at least one compound selected from 2-methyl-4-isothiazolin-3-one, 2-n-octyl-4-isothiazolin-3-one, 5-chloro-2-methyl-4-isothiazolin-3-one, and 1,2-benzisothiazolin-3-one.

1.4. Additive

The binder composition according to one embodiment of the invention may optionally include an additive in addition to the polymer (A), the liquid medium (B), and the isothiazoline-based compound (C). Examples of the additive include a polymer other than the polymer (A), a thickener, and the like.

The polymer other than the polymer (A) may be selected taking account of the type of the active material included in the slurry in order to improve adhesion to the active material, for example. Examples of the polymer other than the polymer (A) include poly(meth)acrylic acid, poly(meth)acrylamide, polyvinylpyrrolidone, an acrylic emulsion, a styrene-butadiene copolymer latex, and the like. When the polymer other than the polymer (A) is added to the binder composition according to one embodiment, the polymer other than the polymer (A) is preferably added so that the mass ratio "polymer (A):polymer other than polymer (A)" is 1:99 to 80:20.

When the binder composition according to one embodiment of the invention includes the thickener, it is possible to further improve the applicability of the binder composition, the charge-discharge characteristics of the resulting electrical storage device, and the like.

Examples of the thickener include cellulose compounds such as carboxymethyl cellulose, methyl cellulose, and hydroxypropyl cellulose; ammonium salts or alkali metal salts of the cellulose compounds; polyvinyl alcohol-based (co)polymers such as polyvinyl alcohol, modified polyvinyl alcohol, and an ethylene/vinyl alcohol copolymer; water-soluble polymers such as a saponified product of a copolymer of a vinyl ester and an unsaturated carboxylic acid (e.g., (meth)acrylic acid, maleic acid, or fumaric acid); and the like. It is particularly preferable to use an alkali metal salt of carboxymethyl cellulose, an alkali metal salt of poly(meth)acrylic acid, or the like as the thickener.

Examples of a commercially available product of these thickeners include CMC1120, CMC1150, CMC2200, CMC2280, CMC2450 (alkali metal salts of carboxymethyl cellulose) (manufactured by Daicel Corporation); and the like.

When the binder composition according to one embodiment of the invention includes the thickener, the thickener is preferably used in an amount of 5 parts by mass or less, and more preferably 0.1 to 3 parts by mass, based on the total solid content in the binder composition.

2. Electrical Storage Device Electrode Slurry

An electrical storage device electrode slurry may be prepared using the binder composition according to one embodiment of the invention. The term "electrical storage device electrode slurry" used herein refers to a dispersion that is used to form an active material layer on the surface of a collector. An electrical storage device electrode slurry according to one embodiment of the invention includes the binder composition and an active material. Each material included in the electrical storage device electrode slurry according to one embodiment of the invention is described below. Note that the binder composition is the same as described above, and description thereof is omitted.

2.1. Active Material

Examples of the active material used for the electrical storage device electrode slurry according to one embodiment of the invention include a carbon material, a silicon material, an oxide that includes a lithium atom, a lead compound, a tin compound, an arsenic compound, an antimony compound, an aluminum compound, and the like.

Examples of the carbon material include amorphous carbon, graphite, natural graphite, mesocarbon microbeads (MCMB), pitch-based carbon fibers, and the like.

Examples of the silicon material include silicon, silicon oxides, silicon alloys, silicon oxide complexes represented by SiC, $SiO_xC_y$ ($0<x\leq3$, $0<y\leq5$), $Si_3N_4$, $Si_2N_2O$, and $SiO_x$ ($0<x\leq2$) (e.g., the materials disclosed in JP-A-2004-185810 and JP-A-2005-259697), and the silicon materials disclosed in JP-A-2004-185810. A silicon oxide represented by $SiO_x$ ($0<x<2$, and preferably $0.1\leq x\leq1$) is preferable as the silicon oxide. An alloy of silicon and at least one transition metal selected from the group consisting of titanium, zirconium, nickel, copper, iron, and molybdenum is preferable as the silicon alloy. Alloys of silicon and these transition metals have high electron conductivity, and exhibit high strength. When the active material includes these transition metals, the transition metal present on the surface of the active material is oxidized to form an oxide having a surface hydroxyl group, and the binding capability with the binder is further improved. It is preferable to use a silicon-nickel alloy or a silicon-titanium alloy as the silicon alloy. It is particularly preferable to use a silicon-titanium alloy as the silicon alloy. The silicon content in the silicon alloy is preferably 10 mol % or more, and more preferably 20 to 70 mol %, based on the total metal elements included in the silicon alloy. Note that the silicon material may be a single crystal, polycrystalline, or amorphous.

Examples of the oxide that includes a lithium atom include lithium cobaltate, lithium nickelate, lithium manganate, lithium nickel cobalt manganate, $LiFePO_4$, $LiCoPO_4$, $LiMnPO_4$, $Li_{0.90}Ti_{0.05}Nb_{0.05}Fe_{0.30}Co_{0.30}Mn_{0.30}PO_4$, and the like.

The active material layer may include such as conductive polymers such as polyacene; complex metal oxides represented by $A_xB_yO_z$ (wherein A is an alkali metal or a transition metal, B is at least one metal selected from transition metals such as cobalt, nickel, aluminum, tin, and manganese, O is an oxygen atom, and X, Y, and Z are numbers that satisfy $1.10>X>0.05$, $4.00>Y>0.85$, and $5.00>Z>1.5$); other metal oxides; and the like.

The electrical storage device electrode slurry according to one embodiment of the invention may be used to produce the positive electrode and the negative electrode of the electrical storage device.

When producing the positive electrode, it is preferable to use the oxide that includes a lithium atom as the active material.

When producing the negative electrode, it is preferable that the active material include the silicon material. Since the silicon material has a large lithium occlusion capacity per unit weight as compared with other active materials, the electrical storage capacity of the resulting electrical storage device can be improved when the active material includes the silicon material. This makes it possible to improve the output and the energy density of the electrical storage device. It is more preferable that the negative electrode active material be a mixture of the silicon material and the carbon material. Since the carbon material shows a small change in volume due to charge and discharge, it is possible to reduce the effects of a change in volume of the silicon material by utilizing a mixture of the silicon material and the carbon material as the negative electrode active material, and further improve the adhesion between the active material layer and the collector. A carbon-coated silicon material in which a film of the carbon material is formed on the surface of the silicon material may be used as the mixture of the silicon material and the carbon material. It is possible to more effectively reduce the effects of a change in volume of the silicon material due to charge and discharge through the carbon material formed on the surface of the silicon material by utilizing the carbon-coated silicon material, and easily improve the adhesion between the active material layer and the collector.

When silicon (Si) is used as the active material, silicon can occlude up to twenty-two lithium atoms per five silicon atoms ($5Si+22Li \rightarrow Li_{22}Si_5$). As a result, the theoretical capacity of silicon reaches 4200 mAh/g. However, silicon shows a large change in volume when occluding lithium. Specifically, while a carbon material expands by a factor of up to about 1.2 as a result of occluding lithium, a silicon material expands by a factor of up to about 4.4 as a result of occluding lithium. Therefore, a silicon material produces a fine powder, and causes separation from the collector and separation of the active material as a result of repeated expansion and contraction, and the conductive network in the active material layer breaks. Accordingly, the cycle characteristics significantly deteriorate within a short time.

However, the electrical storage device electrode according to one embodiment of the invention does not show the above problem, and exhibits excellent electrical characteristics even when a silicon material is used. This is considered to be because the polymer (A) can strongly bind the silicon material, and expand and contract even when the silicon material expands as a result of occluding lithium to maintain a state in which the silicon material is strongly bound.

The content of the silicon material in the active material (=100 mass %) is preferably 1 mass % or more, more preferably 1 to 50 mass %, still more preferably 5 to 45 mass %, and particularly preferably 10 to 40 mass %.

When using the silicon material and the carbon material in combination as the active material, the silicon material is preferably used in an amount of 4 to 40 parts by mass, more preferably 5 to 35 parts by mass, and particularly preferably 5 to 30 parts by mass, based on the total mass (=100 parts by mass) of the active material, from the viewpoint of maintaining a sufficient binding/bonding capability. When the amount of the silicon material is within the above range, since the volume expansion of the carbon material due to occlusion of lithium is smaller than that of the silicon material, a change in volume of the active material layer that includes the carbon material and the silicon material can be reduced, and the adhesion between the collector and the active material layer can be further improved.

It is preferable that the active material have a particulate shape. The average particle size of the active material is preferably 0.1 to 100 micrometers, and more preferably 1 to 20 micrometers.

Note that the average particle size of the active material refers to the volume average particle size calculated from the particle size distribution measured using a particle size distribution analyzer that utilizes a laser diffraction method as the measurement principle. Examples of such a laser diffraction particle size distribution analyzer include HORIBA LA-300 and HORIBA LA-920 (manufactured by Horiba, Ltd.); and the like. These particle size distribution analyzers can measure the particle size distribution of the primary particles of the active material, and the particle size distribution of the secondary particles that are formed by aggregation of the primary particles. Therefore, the average particle size measured using these particle size distribution analyzers can be used as an index of the dispersion state of the active material included in the electrical storage device electrode slurry. The average particle size of the active material may also be measured by centrifuging the slurry to precipitate the active material, removing the supernatant liquid, and analyzing the active material using the above method.

The active material is preferably used so that the amount of the polymer (A) is 0.1 to 25 parts by mass, and more preferably 0.5 to 15 parts by mass, based on 100 parts by mass of the active material. When the active material is used in an amount within the above range, it is possible to produce an electrode that exhibits more excellent adhesion, has low resistance, and exhibits more excellent charge-discharge characteristics.

2.2. Additive

The electrical storage device electrode slurry according to one embodiment of the invention may optionally include an additional component in addition to the above components. Examples of the additional component include a conductivity-imparting agent, a thickener, a liquid medium (excluding the liquid medium included in the binder composition), and the like.

2.2.1. Conductivity-Imparting Agent

Specific examples of the conductivity-imparting agent used for a lithium-ion secondary battery include carbon and the like. Examples of carbon include activated carbon, acetylene black, Ketjen black, furnace black, graphite, carbon fibers, fullerenes, and the like. Among these, acetylene black and furnace black may preferably be used. The conductivity-imparting agent is preferably used in an amount of 20 parts by mass or less, more preferably 1 to 15 parts by mass, and particularly preferably 2 to 10 parts by mass, based on 100 parts by mass of the active material.

2.2.2. Thickener

The electrical storage device electrode slurry may include the thickener in order to improve the applicability of the electrical storage device electrode slurry. Specific examples of the thickener include cellulose derivatives such as carboxymethyl cellulose, methyl cellulose, ethyl cellulose, hydroxymethyl cellulose, hydroxypropylmethyl cellulose, and hydroxyethylmethyl cellulose; ammonium salts or alkali metal salts of these cellulose derivatives; polycarboxylic acids such as poly(meth)acrylic acid and a modified poly(meth)acrylic acid; alkali metal salts of these polycarboxylic acids; polyvinyl alcohol-based (co)polymers such as polyvinyl alcohol, a modified polyvinyl alcohol, and an ethylene/vinyl alcohol copolymer; water-soluble polymers such as a saponified product of a copolymer of a vinyl ester and an unsaturated carboxylic acid (e.g., (meth)acrylic acid, maleic acid, or fumaric acid); and the like. The thickener is preferably used in an amount of 0.1 to 10 parts by mass, and more preferably 0.5 to 5 parts by mass, based on 100 parts by mass of the active material.

2.2.3. Liquid Medium

Since the electrical storage device electrode slurry according to one embodiment of the invention includes the binder composition, the electrical storage device electrode slurry includes the liquid medium (B) included in the binder composition. The electrical storage device electrode slurry according to one embodiment of the invention may optionally include an additional liquid medium in addition to the liquid medium (B) included in the binder composition.

The liquid medium that is added to the electrical storage device electrode slurry according to one embodiment of the invention may be the same as or different from the liquid medium (B) included in the binder composition. It is preferable to select the liquid medium that is added to the electrical storage device electrode slurry from the liquid media described above in connection with the liquid medium (B) included in the binder composition.

The content of the liquid medium (including the liquid medium (B) included in the binder composition) in the electrical storage device electrode slurry according to one embodiment of the invention is preferably selected so that the solid content (i.e., the ratio of the total mass of the components other than the liquid medium with respect to the total mass of the slurry (hereinafter the same)) in the slurry is 30 to 70 mass %, and more preferably 40 to 60 mass %.

2.3. Method for Preparing Electrical Storage Device Electrode Slurry

The electrical storage device electrode slurry according to one embodiment of the invention may be prepared using an arbitrary method as long as the electrical storage device electrode slurry includes the binder composition and the active material.

It is preferable to prepare the electrical storage device electrode slurry by adding the active material and an optional additive component to the binder composition, and mixing the components from the viewpoint of more efficiently and inexpensively preparing a slurry that exhibits more excellent dispersibility and stability. The binder composition, the active material, and an optional additive component may be mixed by stirring using a known method.

When preparing the electrical storage device electrode slurry by mixing (stirring) the components, it is necessary to select a mixer that can stir the components so that aggregates of the active material particles do not remain in the resulting slurry, and select necessary and sufficient dispersion conditions. The degree of dispersion can be measured using a grind gage. It is preferable to mix and disperse the components so that the resulting slurry does not include aggregates having a size larger than 100 micrometers. Examples of the mixer that meets the above conditions include a ball mill, a bead mill, a sand mill, a deaerator, a pigment disperser, a grinder, an ultrasonic disperser, a homogenizer, a planetary mixer, a Hobart mixer, and the like.

It is preferable to perform at least part of the electrical storage device electrode slurry preparation process (i.e., the component mixing operation) under reduced pressure. This makes it possible to prevent a situation in which bubbles are formed in the resulting active material layer. It is preferable to mix the components under a reduced pressure (absolute pressure) of about $5.0 \times 10^3$ to $5.0 \times 10^5$ Pa.

2.5. Features of Electrical Storage Device Electrode Slurry

It was confirmed that the particles of the polymer (A) and/or the particles of the active material move along the film thickness direction (hereinafter may be referred to as "migration") due to surface tension when applying the electrical storage device electrode slurry to the surface of the collector, and drying the applied electrical storage device electrode slurry. Specifically, the particles of the polymer (A) and/or the particles of the active material tend to move toward the side of the film that does not come in contact with the collector (i.e., the gas-solid interface at which water evaporates).

As a result, the distribution of the particles of the polymer (A) and the particles of the active material becomes non-uniform in the film thickness direction, whereby a deterioration in electrode characteristics, a deterioration in adhesion between the collector and the active material layer, and the like may occur. For example, when the particles of the polymer (A) that functions as a binder bleed (move) toward the gas-solid interface of the active material layer, and the amount of the particles of the polymer (A) relatively decreases at the interface between the collector and the active material layer, penetration of the electrolyte solution into the active material layer may be hindered, and the electrical characteristics may deteriorate. Moreover, the adhesion between the collector and the active material layer may deteriorate, and separation may occur. The flatness and the smoothness of the surface of the active material layer may also deteriorate when the particles of the polymer (A) bleed.

However, when the particles of the polymer (A) have a surface acid content of more than 1 mmol/g and 6 mmol/g or less, occurrence of the above problems can be suppressed, and it is possible to produce an electrode that exhibits excellent electrical characteristics and excellent adhesion. It is considered that the particles of the polymer (A) are moderately adsorbed on the particles of the active material when the particles of the polymer (A) have a surface acid content within the above range, and it is possible to suppress a situation in which the particles of the polymer (A) bleed toward the gas-solid interface of the active material layer.

It is preferable that the electrical storage device electrode slurry according to one embodiment of the invention have a thread-forming capability of 30 to 80%, more preferably 33 to 79%, and particularly preferably 35 to 78%. If the thread-forming capability is less than 30%, the leveling properties of the slurry may be insufficient when applying the slurry to the collector, and it may be difficult to produce an electrode having a uniform thickness. An in-plane distribution of the charge-discharge reaction may occur when an electrode having a non-uniform thickness is used, and it may be difficult to achieve stable battery characteristics. If the thread-forming capability exceeds 80%, dripping may easily occur when applying the slurry to the collector, and it may be difficult to obtain an electrode having stable quality. When the thread-forming capability is within the above range, it is possible to prevent the above problems, and easily produce an electrode that exhibits excellent electrical characteristics and excellent adhesion.

The term "thread-forming capability" used herein refers to a property measured as described below. A Zahn cup ("Zahn Viscosity Cup No. 5" manufactured by Taiyu Kizai Co., Ltd.) having an orifice (diameter: 5.2 mm) at the bottom thereof is provided. 40 g of the slurry is poured into the Zahn cup in a state in which the orifice is closed. The orifice is opened to allow the slurry to flow out from the orifice. When the time when the orifice is opened is referred to as $T_0$, the time when the slurry no longer flows out from the orifice as if to form a thread is referred to as $T_A$, and the time when the slurry no longer flows out from the orifice is referred to as $T_B$, the thread-forming capability is calculated by the following expression (4).

$$\text{Thread-forming capability (\%)} = ((T_A - T_0)/(T_B - T_0)) \times 100 \quad (4)$$

3. Electrical Storage Device Electrode

An electrical storage device electrode according to one embodiment of the invention is described below with reference to FIG. 1. FIG. 1 is a cross-sectional view schematically illustrating an electrical storage device electrode 100 (hereinafter may be referred to as "electrode") according to one embodiment of the invention. As illustrated in FIG. 1, the electrical storage device electrode 100 includes a collector 10, and an active material layer 20 that is formed on the surface of the collector 10. The active material layer 20 is formed by applying the electrical storage device electrode slurry to the surface of the collector 10, and drying the applied electrical storage device electrode slurry. The electrode 100 may be produced by applying the slurry to the surface of an arbitrary collector 10 (e.g., metal foil) to form a film, and removing the liquid medium from the film by drying to form the active material layer 20. The electrode 100 thus produced has a configuration in which the active material layer 20 that includes the polymer (A), the active material, and an optional additive component is bonded to the collector 10. The electrode 100 ensures excellent adhesion between the collector 10 and the active material layer 20, and exhibits excellent charge-discharge rate characteristics (i.e., electrical characteristics). Moreover, removal of the active material is suppressed, and a change in thickness of the electrode due to charge occurs to only a small extent.

A material for forming the collector 10 is not particularly limited so long as the collector 10 is formed of a conductive material. A collector formed of a metal (e.g., iron, copper, aluminum, nickel, or stainless steel) may be used for a lithium-ion secondary battery. The above effects are most advantageously achieved when using an aluminum collector for the positive electrode, and using a copper collector for the negative electrode. A collector formed of a perforated metal, an expanded metal, wire gauze, a foam metal, sintered metal fibers, a metal-plated resin sheet, or the like is used for a nickel-hydrogen secondary battery. The shape and the thickness of the collector 10 are not particularly limited. The collector 10 is preferably in the shape of a sheet having a thickness of about 0.001 to 0.5 mm.

The thickness of the active material layer 20 is not particularly limited, but is normally 0.005 to 5 mm, and preferably 0.01 to 2 mm. Although the electrical storage device electrode 100 illustrated in FIG. 1 has a configuration in which the active material layer 20 is formed on only one side of the collector 10, the active material layer 20 may be formed on each side of the collector 10.

The slurry may be applied to the collector 10 using an arbitrary application method. Examples of the application method include a doctor blade method, a dipping method, a reverse roll method, a direct roll method, a gravure method, an extrusion method, an immersion method, a brush coating method, and the like. The amount of the slurry applied to the collector is not particularly limited. It is preferable to apply the slurry to the collector so that an active material layer obtained by removing the liquid medium has a thickness of 0.005 to 5 mm, and more preferably 0.01 to 2 mm.

The liquid medium may be removed from the film formed by applying the slurry using an arbitrary method. For example, the liquid medium may be removed by drying the film using warm air, hot air, or low humid air, or drying the film under vacuum, or drying the film by applying (far) infrared radiation, electron beams, or the like. The drying speed may be appropriately set so that the liquid medium can be removed as quickly as possible while preventing a situation in which cracks occur in the active material layer due to stress concentration, or the active material layer is removed from the collector.

It is preferable to increase the density of the active material layer by pressing the dried collector after removing the liquid medium. The collector may be pressed using a die press method, a roll press method, or the like. The press conditions are appropriately set taking account of the type of press and the desired density of the active material layer. The press conditions can be easily set by a person having ordinary skill in the art by performing some preliminary experiments. When using a roll press, the linear pressure of the roll press may be set to 0.1 to 10 t/cm, and preferably 0.5 to 5 t/cm, the roll temperature may be set to 20 to 100° C., and the feed speed (roll rotational speed) of the film (from which the liquid medium has been removed) may be set to 1 to 80 m/min, and preferably 5 to 50 m/min.

The density of the active material layer after pressing is preferably 1.5 to 4.0 g/cm$^3$, and more preferably 1.7 to 3.8 g/cm$^3$, when using the resulting electrode as the positive electrode. The density of the active material layer after pressing is preferably 1.2 to 1.9 g/cm$^3$, and more preferably 1.3 to 1.8 g/cm$^3$, when using the resulting electrode as the negative electrode.

It is preferable to heat the pressed film under reduced pressure to completely remove the liquid medium. The pressure (absolute pressure) is preferably set to 50 to 200 Pa, and more preferably 75 to 150 Pa. The heating temperature is preferably set to 100 to 200° C., and more preferably 120 to 180° C. The heating time is preferably set to 2 to 12 hours, and more preferably 4 to 8 hours.

The electrical storage device electrode thus produced ensures excellent adhesion between the collector and the active material layer, and exhibits excellent charge-discharge characteristics.

When using the silicon material as the active material used to produce the electrical storage device electrode according to one embodiment of the invention, it is preferable that the silicon content in 100 parts by mass of the active material layer be 2 to 30 parts by mass, more preferably 2 to 20 parts by mass, and particularly preferably 3 to 10 parts by mass. When the silicon content in the active material layer is within the above range, the electrical storage capacity of the resulting electrical storage device can be improved, and an active material layer having a uniform silicon distribution can be obtained. If the silicon content in the active material layer is less than the above range, the electrical storage capacity of the resulting electrical storage device may decrease. If the silicon content in the active material layer exceeds the above range, the electrical storage capacity of the resulting electrical storage device is improved, but the active material layer may be easily removed from the electrode due to repeated charge and discharge, and the electrode may deteriorate. Moreover, the silicon-containing component may easily aggregate, and the active material layer may have a non-uniform silicon distribution. As a result, the active material layer may exhibit an inferior binding/bonding capability, and the fall-off resistance may become insufficient.

The silicon content in the active material layer may be measured as described below.

(1) The silicon content (at a plurality of points) in a sample having a known silicon content is measured using an X-ray fluorescence spectrometer ("PANalytical Magix PRO" manufactured by Spectris Co., Ltd.), and a calibration curve is drawn.

(2) 3 g of the entire active material layer in the depth direction is scraped off from the electrical storage device electrode using a spatula or the like, uniformly mixed using a mortar or the like, and pressed in the shape of a disc-like plate having a diameter of 3 cm. When it is difficult to form the active material layer alone, an adhesive having a known elemental composition may be appropriately used. Examples of such an adhesive include a styrene-maleic acid resin, a boric acid powder, a cellulose powder, and the like. When the silicon content is high, and it is difficult to ensure the linearity of the calibration curve, the sample may be diluted using the adhesive. When using the adhesive, it is preferable to also use the adhesive for the sample for drawing the calibration curve in order to prevent a shift in calibration curve due to a matrix effect.

(3) The resulting plate is analyzed using the X-ray fluorescence spectrometer, and the silicon content is calculated from the calibration curve. When the adhesive is used, the silicon content is calculated after subtracting the weight of the adhesive.

It is preferable that the active material layer included in the electrical storage device electrode according to one embodiment of the invention have a polymer distribution coefficient of 0.6 to 1.0, more preferably 0.7 to 1.0, and particularly preferably 0.75 to 0.95.

The term "polymer distribution coefficient" used herein refers to a coefficient that is defined using the following measurement method. The polymer distribution coefficient of the electrical storage device electrode 100 illustrated in FIG. 1 is defined as described below.

(1) The active material layer 20 is formed on one side of the collector 10 using the above method. The resulting electrical storage device electrode is divided into two parts to obtain two electrical storage device electrodes 100 that include the active material layer 20.

(2) A double-sided tape ("NW-25" manufactured by Nichiban Co., Ltd.) is attached to an aluminum plate provided in advance, and a Kapton tape ("650S" manufactured by Teraoka Corporation) is attached to the double-sided tape so that the adhesive face is positioned on the upper side.

(3) The active material layer 20 of one of the electrical storage device electrodes 100 obtained in (1) is placed on the adhesive face of the Kapton tape provided in (2), and compression-bonded using a roller.

(4) The aluminum plate prepared as described above is secured on a horizontal surface so that the collector 10 faces upward, and the collector 10 is pulled upward at a constant speed so that the collector 10 forms an angle of 90° with the aluminum plate to remove the collector 10 from the active material layer 20.

(5) The active material layer 20 that remains on the collector 10 and the active material layer 20 that remains on the Kapton tape are scraped off up to a depth of 1.5 micrometers from the surface of the active material layer 20 to obtain a measurement sample A. Note that the entire active material layer 20 is scraped off when the thickness of the remaining active material layer 20 is 1.5 micrometers or less.

(6) The entire active material layer 20 is scraped off from the other of the electrical storage device electrodes 100 obtained in (1) to obtain a measurement sample B.

(7) The measurement sample A and the measurement sample B are analyzed by pyrolysis gas chromatography using a high-frequency induction heating-type pyrolyzer to calculate the content (mass %) (per unit weight) of the polymer component in each sample. The resulting values are substituted into the following expression (5) to calculate the polymer distribution coefficient.

Polymer distribution coefficient=(polymer content (mass %) in measurement sample $A$)/(polymer content (mass %) in measurement sample $B$)  (5)

It is considered that the polymer component is uniformly distributed in the active material layer 20 when the polymer distribution coefficient is 1. It is considered that the polymer component is unevenly (locally) distributed near the interface between the collector 10 and the active material layer 20 when the polymer distribution coefficient exceeds 1, and the polymer component is thinly distributed near the interface between the collector 10 and the active material layer 20 when the polymer distribution coefficient is less than 1.

Therefore, since the polymer (A) is sufficiently present near the interface between the collector and the active material layer when the polymer distribution coefficient of the active material layer is 0.6 to 1.0, adhesion between the collector and the active material layer is improved, and an electrical storage device electrode that exhibits excellent fall-off resistance and electrical characteristics is obtained. If the polymer distribution coefficient of the active material layer is less than the above range, adhesion between the collector and the active material layer may decrease since the amount of the polymer (A) that functions as a binder is relatively small at the interface between the collector and the active material layer. Moreover, the smoothness of the surface of the active material layer may deteriorate due to bleeding. If the polymer distribution coefficient of the active material layer exceeds the above range, an increase in internal resistance of the electrode and a deterioration in electrical characteristics may occur since the binder component (insulator) is locally distributed at the interface between the collector and the active material layer.

It is preferable that the active material layer included in the electrical storage device electrode according to one embodiment of the invention have a density of 1.3 to 1.8 g/cm³, more preferably 1.4 to 1.8 g/cm³, and particularly preferably 1.5 to 1.7 g/cm³. When the density of the active material layer is within the above range, the adhesion between the collector and the active material layer is improved, and an electrode that exhibits excellent fall-off resistance and electrical characteristics is easily obtained. If the density of the active material layer is less than the above range, the polymer (A) included in the active material layer may not sufficiently function as a binder, and the active material layer may aggregate or may be removed (i.e., fall-off resistance may deteriorate). If the density of the active material layer exceeds the above range, the polymer (A) included in the active material layer may function as a binder to an excessive extent, and the active material may be bonded (bound) too strongly, and may not follow the flexible collector. As a result, the collector and the active material layer may be separated from each other at the interface between the collector and the active material layer.

The term "density" used herein in connection with the active material layer refers to a value measured using the following measurement method. The active material layer having an area C (cm²) and a thickness D (micrometers) is formed on one side of the collector using the above method to produce an electrical storage device electrode. When the mass of the collector is A (g), and the mass of the electrical storage device electrode is B (g), the density of the active material layer is calculated by the following expression (6).

Density (g/cm³) of active material layer=$(B(g)-A(g))/(C(cm^2) \times D(\text{micrometers}) \times 10^{-4})$  (6)

4. Electrical Storage Device

An electrical storage device according to one embodiment of the invention includes the electrode according to one embodiment of the invention and an electrolyte solution, and may be produced by a normal method using various parts (e.g., separator). More specifically, the electrical storage device may be produced by placing a negative electrode on a positive electrode via a separator to form a laminate, rolling or folding the laminate in the shape of a battery, placing the laminate in a battery casing, injecting an electrolyte solution into the battery casing, and sealing the battery casing, for example. The battery may have an arbitrary shape (e.g., coin-like shape, cylindrical shape, square shape, or laminate-like shape).

The electrolyte solution may be in the form of a liquid or gel. The electrolyte solution may be selected from known electrolyte solutions used for an electrical storage device taking account of the type of the active material so that the function of the battery is effectively achieved. The electrolyte solution may be a solution prepared by dissolving an electrolyte in an appropriate solvent.

An arbitrary known lithium salt may be used as the electrolyte used when producing a lithium-ion secondary battery. Specific examples of the lithium salt include $LiClO_4$, $LiBF_4$, $LiPF_6$, $LiCF_3CO_2$, $LiAsF_6$, $LiSbF_6$, $LiB_{10}Cl_{10}$, $LiAlCl_4$, LiCl, LiBr, $LiB(C_2H_5)_4$, $LiCF_3SO_3$, $LiCH_3SO_3$, $LiC_4F_9SO_3$, $Li(CF_3SO_2)_2N$, lithium lower aliphatic carboxylates, and the like. When producing a nickel-hydrogen secondary battery, a potassium hydroxide aqueous solution (concentration: 5 mol/l or more) may be used as the electrolyte solution, for example.

The solvent used to dissolve the electrolyte is not particularly limited. Specific examples of the solvent include carbonate compounds such as propylene carbonate, ethylene carbonate, butylene carbonate, dimethyl carbonate, methylethyl carbonate, and diethyl carbonate; lactone compounds such as gamma-butyrolactone; ether compounds such as trimethoxymethane, 1,2-dimethoxyethane, diethyl ether, 2-ethoxyethane, tetrahydrofuran, and 2-methyltetrahydrofuran; sulfoxide compounds such as dimethyl sulfoxide; and the like. The solvent may be one or more compounds selected from these compounds. The concentration of the electrolyte in the electrolyte solution is preferably 0.5 to 3.0 mol/l, and more preferably 0.7 to 2.0 mol/l.

5. Examples

The invention is further described below by way of examples. Note that the invention is not limited to the following examples. Note that the unit "parts" used in the examples and comparative examples refers to "parts by mass", and the unit "%" used in the examples and comparative examples refers to "mass %", unless otherwise specified.

5.1. Example 1

5.1.1. Synthesis and Evaluation of Polymer (A)

(1) Synthesis of Polymer (A)

A temperature-adjustable autoclave equipped with a stirrer was sequentially charged with 300 parts by mass of water, 0.6 parts by mass of sodium dodecylbenzenesulfonate, 1.0 part by mass of potassium persulfate, 0.5 parts by mass of sodium hydrogen sulfite, 0.2 parts by mass of an alpha-methylstyrene dimer, 0.2 parts by mass of dodecylmercaptan, and the monomer components shown in Table 1 (i.e., 49 parts by mass of 1,3-butadiene, 22 parts by mass of styrene, 4 parts by mass of methyl methacrylate, 7 parts by mass of acrylic acid, 10 parts by mass of itaconic acid, and 8 parts by mass of acrylonitrile). The mixture was polymerized at 70° C. for 8 hours. When 3 hours had elapsed after the start of addition of the monomer components, 1.0 part by mass of an alpha-methylstyrene dimer and 0.3 parts by mass of dodecylmercaptan were added to the mixture. The temperature inside the autoclave was increased to 80° C., and the mixture was reacted for 2 hours to obtain a latex. The pH of the latex was adjusted to 7.0, followed by the addition of 5 parts by mass (solid basis) of potassium tripolyphosphate (10 mass % aqueous solution). The residual monomers were removed by steam distillation, and the residue was concentrated under reduced pressure to obtain an aqueous dispersion including particles of the polymer (A) (content: 35 mass %).

(2) Measurement of Average Particle Size

The particle size distribution of the aqueous dispersion was measured using a particle size distribution analyzer ("FPAR-1000" manufactured by Otsuka Electronics Co., Ltd.) that utilizes a dynamic light scattering method as the measurement principle, and the average particle size (D50) was determined from the particle size distribution, and found to be 220 nm.

(3) Measurement of THF Insoluble Content

About 10 g of the aqueous dispersion was weighed on a Teflon (registered trademark) Petri dish (diameter: 8 cm), and heated at 120° C. for 1 hour to remove the solvent to form a film. 1 g of the resulting film (polymer) was immersed in 400 mL of tetrahydrofuran (THF), followed by shaking at 50° C. for 3 hours. After filtering the THF phase through a wire gauze (300 mesh), THF included in the filtrate was evaporated off, and the weight (Y (g)) of the residue was measured. The THF insoluble content in the polymer (A) calculated by the following expression (7) was 99%.

$$\text{THF insoluble content (mass \%)} = ((1-Y)/1) \times 100 \quad (7)$$

(4) DSC Analysis

The polymer (A) was separated from the aqueous dispersion, and subjected to DSC analysis in accordance with JIS K 7121 using a differential scanning calorimeter (DSC). It was confirmed that the polymer (A) had only one glass transition temperature (Tg) at −20° C.

5.1.2. Preparation and Evaluation of Binder Composition (1) Preparation of Binder Composition 10.1 g of an aqueous suspension including 5-chloro-2-methyl-4-isothiazolin-3-one (1%) was added to 1000 g of the aqueous dispersion including the polymer (A). The mixture was stirred at 300 rpm to prepare a binder composition.

The content of 5-chloro-2-methyl-4-isothiazolin-3-one in the binder composition may be determined by analyzing the binder composition as described below. 2.0 g of the binder composition was weighed, and aggregated by adding an aluminum sulfate aqueous solution. The aggregated polymer component was filtered, and quantitatively determined using a high-performance liquid chromatography device (column: micro Bondasphere 5 micro C18-100 angstrom (inner diameter: 3.9 mm, length: 150 mm) manufactured by Waters, mobile phase: prepared by adding trifluoroacetic acid to 2 L of a 0.01 M ammonium acetate solution prepared using distilled water, adjusting the pH of the mixture to 4.0, and adding 500 mL of acetonitrile for high-performance liquid chromatography, flow rate: 0.6 mL/min). The concentration (content) of 5-chloro-2-methyl-4-isothiazolin-3-one thus determined was 100 ppm.

(2) Measurement of Surface Acid Content of Polymer Particles

The surface acid content of the particles of the polymer (A) included in the binder composition was measured as described below. The reagent bottle situated over the titration burette of a potentiometric titration device ("AT-510" manufactured by Kyoto Electronics Manufacturing Co., Ltd.) was charged with 0.005 mol/L of sulfuric acid, and it was determined whether or not the electrical conductivity of ultrapure water was 2 microsiemens or less. A purging operation was performed to remove air from the burette, and bubbles were removed from the nozzle. About 1 g (solid basis) of the binder composition was sampled in a 300 mL beaker, and the weight thereof was recorded. The binder composition was diluted with ultrapure water up to 200 mL, and a 1 mol/L sodium hydroxide aqueous solution was added dropwise to the mixture. When the endpoint was reached, the mixture was stirred about 30 seconds, and whether or not the electrical conductivity was constant, was determined. The RESET button provided by the measurement program was pressed (measurement standby state). The START button provided by the measurement program was pressed to start measurement using 0.005 mol/L sulfuric acid. When the endpoint was reached, the operation ended automatically, and a file was stored. The resulting curve was analyzed, and the surface acid content was calculated by the following expression (8) using the amount of sulfuric acid used. The surface acid content of the polymer (A) thus determined was 2.51 mmol/g.

Surface acid content (mmol/g)=amount (mL) of acid used in carboxylic acid region of surface of particle×acid concentration (mol/L)×degree of ionization/sample weight(g)/1000 (8)

(3) Measurement of Zeta Potential of Polymer Particles

The zeta potential of the particles of the polymer (A) included in the binder composition was measured using a zeta potential analyzer (manufactured by Brookhaven Instruments Corporation). The zeta potential of the particles of the polymer (A) thus measured was −25 mV.

(4) Evaluation of Decay Resistance of Binder Composition

A large amount of binder composition is normally stored for use in an electrical storage device factory, and sequentially consumed. If bacteria and the like grow when the binder composition is stored, a slurry prepared using the binder composition may easily show aggregation, and the crack resistance of the resulting electrode, and the charge-discharge characteristics of the resulting electrical storage device may deteriorate. The decay resistance of the binder composition was evaluated as described below.

5 g of a bacteria liquid was added to 100 g of the binder composition, and the mixture was stored at 35° C. for 2 weeks. After the addition of 5 g of the bacteria liquid, the mixture was stored at 35° C. for 2 months. The number of bacteria included in the binder composition was calculated by comparing the density of the bacteria colony produced after culture at 28° C. for 48 hours in a thermostat using a commercially available simple medium ("EASICULT TTC" manufactured by Orion Diagnostica (Finland)) with a comparison table. The bacteria liquid was prepared by adding *Comamonas acidovorans* (indicator bacteria) to the aqueous dispersion including the polymer (A) (content: 35 mass %), and allowing the aqueous dispersion to stand until the number of bacteria reached $10^7$ per mL.

A small number of bacteria are observed when the binder composition exhibits excellent storage stability. It is desirable that the number of bacteria be 0 per mL. Note that the number of bacteria may be less than $10^4$ per mL when producing an electrode. An electrode having more excellent characteristics can be produced when the number of bacteria is less than $10^3$ per mL. If the number of bacteria exceeds $10^4$ per mL, it may be difficult to produce a homogeneous electrode, and the electrode productivity may decrease since the amount of foreign substance produced increases due to bacteria. Therefore, the threshold value of the number of bacteria is $10^4$ per mL. The evaluation standard was set as follows. The evaluation results are shown in Table 1.

A: The number of bacteria was less than $10^3$ per mL.
B: The number of bacteria was $10^3$ per mL or more and less than $10^4$ per mL.
C: The number of bacteria was more than $10^4$ per mL.

(5) Evaluation of Freezing Temperature of Binder Composition

A large amount of binder composition is normally stored for use in an electrical storage device factory, and sequentially consumed. The binder composition storage environment is not normally strictly controlled from the viewpoint of cost. Therefore, the binder composition may be subjected to a low-temperature environment close to 0° C. in winter. Therefore, the binder composition must not freeze at 0° C., and is required to have a freezing temperature of −0.5° C. or less. It was determined that a binder composition having a freezing temperature of −0.5° C. or less had excellent storage stability.

The freezing temperature of the binder composition was measured as described below. 1000 g of the binder composition was put in a polyethylene bottle, and stored at −10° C. in a refrigerator, and the temperature (freezing temperature) at which the binder composition froze was measured. The measurement results are shown in Table 1.

5.1.3. Production and Evaluation of Electrical Storage Device Electrode Slurry (1) Synthesis of Silicon Material (Active Material)

A mixture of a ground silicon dioxide powder (average particle size: 10 micrometers) and a ground carbon powder (average particle size: 35 micrometers) was heated for 10 hours under a nitrogen stream (0.5 NL/min) in an electric furnace in which the temperature was adjusted to 1100 to 1600° C. to obtain a silicon oxide powder represented by $SiO_x$ (x=0.5 to 1.1) (average particle size: 8 micrometers). 300 g of the silicon oxide powder was put in a batch-type heating furnace, and heated from room temperature (25° C.) to 1100° C. at a temperature increase rate of 300° C./h under a reduced pressure (absolute pressure) of 100 Pa (maintained using a vacuum pump). The silicon oxide powder was then heated at 1100° C. for 5 hours while maintaining the pressure inside the heating furnace at 2000 Pa, and introducing methane gas at a flow rate of 0.5 NL/min. The silicon oxide powder was then cooled to room temperature at a temperature decrease rate of 50° C./h to obtain about 330 g of a graphite-coated silicon oxide powder. The graphite-coated silicon oxide powder was a conductive powder (active material) in which the surface of silicon oxide was coated with graphite. The graphite-coated silicon oxide powder had an average particle size of 10 micrometers. The ratio of the graphite coating with respect to the entire graphite-coated silicon oxide was 2 mass %.

(2) Preparation of Slurry

A twin-screw planetary mixer ("TK HIVIS MIX 2P-03" manufactured by PRIMIX Corporation) was charged with 1 part by mass (solid basis) of a thickener ("CMC2200" manufactured by Daicel Corporation), 80 parts by mass (solid basis) of artificial graphite (highly crystalline graphite) ("MAG" manufactured by Hitachi Chemical Co., Ltd.) (negative active material), 20 parts by mass (solid basis) of the graphite-coated silicon oxide powder, and 68 parts by mass of water. The mixture was stirred at 60 rpm for 1 hour. After the addition of the binder composition so that the amount of the polymer (A) was 2 parts by mass, the mixture was stirred for 1 hour to obtain a paste. After adjusting the solid content in the paste to 50 mass % by adding water, the mixture was stirred at 200 rpm for 2 minutes, at 1800 rpm for 5 minutes, and at 1800 rpm for 1.5 minutes under reduced pressure (about $2.5 \times 10^4$ Pa) using a stirrer/deaerator ("THINKY Mixer (Awatori Rentarou)" manufactured by THINKY Corporation) to prepare an electrical storage device electrode slurry.

(3) Measurement of Thread-Forming Capability of Slurry

The thread-forming capability of the slurry was measured as described below. A Zahn cup ("Zahn Viscosity Cup No. 5" manufactured by Taiyu Kizai Co., Ltd.) having an orifice (diameter: 5.2 mm) at the bottom thereof was provided. 40 g of the slurry was poured into the Zahn cup in a state in which the orifice was closed. When the orifice was opened, the slurry flowed out from the orifice. The time when the orifice was opened is referred to as $T_0$. The time ($T_A$) in which the slurry continuously flowed out from the orifice to a thread was measured with the naked eye. The time ($T_B$) elapsed until the slurry no longer flowed out from the orifice was also measured. The thread-forming capability was calculated by substituting the values $T_0$, $T_A$, and $T_B$ into the following expression (4). It was determined that the slurry had excellent applicability to the collector when the slurry had a thread-forming capability of 30 to 80%. The thread-forming capability measurement results are shown in Table 1.

Thread-forming capability (%)=(($T_A$-$T_0$)/($T_B$-$T_0$))× 100    (4)

5.1.4. Production and Evaluation of Electrical Storage Device Electrode

(1) Production of Electrical Storage Device Electrode

The slurry prepared as described above was uniformly applied to the surface of a collector formed of copper foil (thickness: 20 micrometers) using a doctor blade method so that the thickness after drying was 80 micrometers. The applied slurry was dried at 60° C. for 10 minutes, and then dried at 120° C. for 10 minutes. The film was pressed using a roll press so that the resulting active material layer had the density shown in Table 1 to obtain an electrical storage device electrode (negative electrode).

(2) Measurement of Peel Strength

A sample having a width of 2 cm and a length of 12 cm was cut from the electrode obtained as described above, and the surface of the active material layer of the sample was bonded to an aluminum plate using a double-sided tape ("Nice Tack (registered trademark)" manufactured by Nichiban Co., Ltd., width 25 mm). A tape (width: 18 mm) ("CELLOTAPE (registered trademark)" manufactured by Nichiban Co., Ltd., specified in JIS Z 1522) was bonded to the surface of the collector of the sample. A force (N/m) required to remove the tape by 2 cm at a rate of 50 mm/min and an angle of 90° was measured six times, and the average value was calculated, and taken as the adhesion (peel strength, N/m). It was determined that the adhesion between the collector and the active material layer was high (i.e., the active material layer was rarely separated from the collector) when the peel strength was high. It was quantitatively determined that the adhesion between the collector and the active material layer was high when the peel strength was 7 N/m or more. The peel strength measurement results are shown in Table 1.

(3) Measurement of Silicon Content in Active Material Layer

The silicon content in the active material layer included in the electrical storage device electrode (negative electrode) was measured as described below.

(i) The silicon content in a sample (at a plurality of points) having a known silicon content was measured using an X-ray fluorescence spectrometer ("PANalytical Magix PRO" manufactured by Spectris Co., Ltd.) (fluorescent X-rays (Kalpha-rays)), and a calibration curve was drawn. In order to prevent a shift in calibration curve due to a matrix effect, the sample having a known silicon content was 5-fold diluted with a styrene-maleic acid resin ("PANalytical PX powder" manufactured by Spectris Co., Ltd.) (i.e., an adhesive having a known elemental composition), uniformly mixed using a mortar, and pressed in the shape of a disc-like plate having a diameter of 3 cm. The following measurement conditions were used. The X-ray tube voltage and current were respectively set to 32 kV and 125 mA. Fluorescent X-rays from silicon were dispersed by Bragg reflection (Bragg condition:2theta=109.1244° using pentaerythritol (interlayer spacing: 4.375 angstroms, plane indices: (0, 0, 2)) as a dispersive crystal, and detected using a gas flow-type detector.

(ii) 1 g of the entire active material layer in the depth direction was scraped off from the electrical storage device electrode (negative electrode) using a spatula. After the addition of 4 g of a styrene-maleic acid resin ("PANalytical PX powder" manufactured by Spectris Co., Ltd.) (i.e., an adhesive having a known elemental composition), the mixture was uniformly mixed using a mortar, and pressed in the shape of a disc-like plate having a diameter of 3 cm.

(iii) The resulting plate was analyzed using the X-ray fluorescence spectrometer, and the silicon content in the active material layer was calculated from the calibration curve.

(4) Measurement of Polymer Distribution Coefficient of Active Material Layer The polymer distribution coefficient of the active material layer included in the electrical storage device electrode (negative electrode) was calculated as described below. The electrical storage device electrode was divided into two parts. A double-sided tape ("NW-25" manufactured by Nichiban Co., Ltd.) (120 mm) was bonded to an aluminum plate (70 mm×150 mm) provided in advance, and a Kapton tape ("650S" manufactured by Teraoka Corporation) was bonded to the double-sided tape so that the adhesive face was positioned on the upper side to obtain a securing stage. The active material layer of a sample (20 mm×100 mm) prepared by cutting the electrical storage device electrode was placed on the securing stage, and compression-bonded using a roller. The securing stage on which the sample was secured was placed on a horizontal surface, and the sample was pulled upward at a constant speed so that the angle formed by the sample and the securing stage was 90° to remove the collector from the adhesive face. The active material layer that remained on the collector and the active material layer that remained on the Kapton tape were scraped off up to a depth of 1.5 micrometers from the surface of the active material layer to obtain a measurement sample A. The entire active material layer was scraped off from the other electrical storage device electrode to obtain a measurement sample B. The measurement sample A and the measurement sample B were analyzed by pyrolysis gas chromatography using a high-frequency induction heating-type pyrolyzer to calculate the content (mass %) (per unit weight) of the polymer component in each sample. The resulting values were substituted into the following expression (5) to calculate the polymer distribution coefficient.

Polymer distribution coefficient=(polymer content (mass %) in measurement sample $A$)/(polymer content (mass %) in measurement sample $B$) (5)

(5) Measurement of Crack Ratio

A sample (width: 2 cm, length: 10 cm) was cut from the electrode obtained as described above, and subjected to a bending test in which the sample was repeatedly bent 100 times in the widthwise direction along a round bar (diameter: 2 mm). The size of cracks that occurred along the round bar was measured with the naked eye to calculate the crack ratio. The crack ratio was calculated by the following expression (9).

Crack ratio (%)=(length of crack (mm)/length of electrode (100 mm))×100 (9)

An electrode that exhibits excellent flexibility and adhesion has a low crack ratio. It is desirable that the electrode have a crack ratio of 0%. However, the electrode may have a crack ratio of up to 20% when producing electrode plates by spirally winding the electrode through a separator. If the electrode has a crack ratio of more than 20%, the electrode may easily break (i.e., the electrode plates cannot be produced), and productivity may decrease. Therefore, the threshold value of the crack ratio is 20%. The crack ratio measurement results are shown in Table 1.

5.1.5. Production and Evaluation of Electrical Storage Device

(1) Production of Counter Electrode (Positive Electrode)

A twin-screw planetary mixer ("TK HIVIS MIX 2P-03" manufactured by PRIMIX Corporation) was charged with 4.0 parts by mass (solid basis) of an electrochemical device electrode binder ("KF Polymer #1120" manufactured by Kureha Corporation), 3.0 parts by mass of a conductive aid ("DENKA BLACK" 50% pressed product, manufactured by Denki Kagaku Kohyo Kabushiki Kaisha), 100 parts by mass (solid basis) of $LiCoO_2$ (average particle size: 5 micrometers, manufactured by Hayashi Kasei Co., Ltd.) (positive electrode active material), and 36 parts by mass of N-methylpyrrolidone (NMP). The mixture was stirred at 60 rpm for 2 hours to prepare a paste. After the addition of NMP to the paste to adjust the solid content to 65 mass %, the mixture was stirred at 200 rpm for 2 minutes, stirred at 1800 rpm for 5 minutes, and stirred at 1800 rpm for 1.5 minutes under vacuum (about $2.5 \times 10^4$ Pa) using a stirrer/deaerator ("THINKY Mixer (Awatori Rentarou)" manufactured by THINKY Corporation) to prepare a positive electrode slurry. The positive electrode slurry was uniformly applied to the surface of an aluminum foil collector using a doctor blade method so that the film had a thickness of 80 micrometers after removing the solvent. The film was heated at 120° C. for 20 minutes to remove the solvent. The film was pressed using a roll press so that the resulting active material layer had a density of 3.0 g/cm³ to obtain a counter electrode (positive electrode).

(2) Assembly of Lithium-Ion Battery Cell

In a gloved box of which the inner atmosphere was substituted with argon (Ar) so that the dew point was −80° C., a negative electrode (diameter: 15.95 mm) prepared by punching the negative electrode produced as described above was placed on a two-electrode coin cell ("HS Flat Cell" manufactured by Hohsen Corp.). A separator ("Celgard #2400" manufactured by Celgard, LLC.) (diameter: 24 mm) prepared by punching a polypropylene porous membrane was placed on the negative electrode, and 500 microliters of an electrolyte solution was injected into the two-electrode coin cell while avoiding entrance of air. A positive electrode (diameter: 16.16 mm) prepared by punching the positive electrode produced as described above was placed on the separator, and the outer casing of the two-electrode coin cell was air-tightly secured using a screw to assemble a lithium-ion battery cell (electrical storage device). Note that the electrolyte solution was prepared by dissolving $LiPF_6$ in ethylene carbonate/ethylmethyl carbonate (mass ratio=1/1) at a concentration of 1 mol/L.

(3) Evaluation of Charge-Discharge Rate Characteristics

The electrical storage device was charged in a thermostat bath (25° C.) at a constant current of 0.2 C until the voltage reached 4.2 V. The electrical storage device was continuously charged at a constant voltage of 4.2 V. The current was cut off (i.e., the electrical storage device was determined to be fully charged) when the current value reached 0.01 C, and the charge capacity at 0.2 C was measured. The electrical storage device was then discharged at a constant current of 0.2 C. The current was cut off (i.e., the electrical storage device was determined to be fully discharged) when the voltage reached 2.7 V, and the discharge capacity at 0.2 C was measured.

The electrical storage device was then charged at a constant current of 3 C. After the voltage reached 4.2 V, the electrical storage device was continuously charged at a voltage of 4.2 V. The current was cut off (i.e., the electrical storage device was determined to be fully charged) when the current value reached 0.01 C, and the charge capacity at 3 C was measured. The electrical storage device was then discharged at a constant current of 3 C. The current was cut off (i.e., the electrical storage device was determined to be fully discharged) when the voltage reached 2.7 V, and the discharge capacity at 3 C was measured.

The charge rate (%) of the electrical storage device was determined by calculating the rate (%) of the charge capacity at 3 C to the charge capacity at 0.2 C. The discharge rate (%) of the electrical storage device was determined by calculating the rate (%) of the discharge capacity at 3 C to the discharge capacity at 0.2 C. When the charge rate and the discharge rate were 80% or more, the charge-discharge rate characteristics were evaluated as "Acceptable". The charge rate and the discharge rate thus determined are shown in Table 1.

Note that "1 C" refers to a current value that requires 1 hour to fully discharge a cell having a constant electric capacitance. For example, "0.1 C" refers to a current value that requires 10 hours to fully discharge a cell, and "10 C" refers to a current value that requires 0.1 hours to fully discharge a cell.

(4) Evaluation of Charge-Discharge Rate Characteristics after Long-Term Storage The binder composition may be stored for a long time (e.g., several months to several years), and the resulting electrical storage device must exhibit constant performance even when the binder composition stored for a long time is used. When an electrical storage device produced using the binder composition that has been stored for a long time exhibits charge-discharge characteristics comparable to those of an electrical storage device produced using the binder composition immediately after preparation, it is determined that the binder composition has excellent long-term storage stability.

1000 g of the binder composition obtained as described above was put in a polyethylene bottle, and stored at 2° C. for 5 months in a refrigerator. An electrical storage device was produced in the same manner as described above, except that the binder composition that had been stored was used, and the charge-discharge rate characteristics were evaluated. The charge rate and the discharge rate thus measured are shown in Table 1.

(5) Evaluation of Change in Thickness of Active Material Layer

The electrical storage device obtained as described above was charged at a constant current of 0.2 C until the voltage reached 4.2 V. The electrical storage device was continuously charged at a constant voltage of 4.2 V. The current was cut off (i.e., the electrical storage device was determined to be fully charged) when the current value reached 0.01 C. The electrical storage device was then discharged at a constant current of 0.2 C. The current was cut off (i.e., the electrical storage device was determined to be fully discharged) when the voltage reached 2.7 V. The electrical storage device that was charged and discharged as described above was charged at a constant current of 0.2 C until the voltage reached 4.2 V. The electrical storage device was continuously charged at a constant voltage of 4.2 V. The current was cut off (i.e., the electrical storage device was determined to be fully charged) when the current value reached 0.01 C.

The electrical storage device was disassembled in a dry room at a dew point of −60° C. or less (room temperature (25° C.)), and the electrical storage device electrode (negative electrode) was removed. The thickness of the active material layer included in the removed electrode was measured, and the ratio of the thickness of the active material layer included in the removed electrode to the thickness (measured in advance) of the active material layer included in the electrode (uncharged state) immediately after production was calculated by the following expression (10). The evaluation results are shown in Table 1.

$$\text{Thickness ratio (\%)} = (\text{thickness after charge})/(\text{immediately after production}) \times 100 \quad (10)$$

When the thickness ratio exceeds 140%, it is considered that the volume expansion of the active material due to charge is not reduced in the active material layer. In this case, the active material may be removed when mechanical stress is applied to the active material. When the thickness ratio is 140% or less, it is considered that the active material is strongly held within the active material layer although the active material undergoes volume expansion due to charge. In this case, the active material is not removed (i.e., the electrode has excellent properties).

5.2. Examples 2 to 8 and Comparative Examples 1 to 3

An aqueous dispersion including particles of the polymer (A) (solid content: 35 mass %) was obtained in the same manner as in Example 1 (see "5.1.1. Synthesis and evaluation of polymer (A)"), except that the type and the amount of each monomer were changed as shown in Tables 1 and 2.

An electrical storage device electrode binder composition was prepared in the same manner as in Example 1, except that the resulting aqueous dispersion including particles of the polymer (A) was used, and the type and the amount of the component (C) were changed as shown in Table 1.

An electrical storage device electrode slurry was prepared in the same manner as in Example 1, except that the resulting binder composition was used, and the content of the active material was changed as shown in Tables 1 and 2, and an electrical storage device electrode and an electrical storage device were produced in the same manner as in Example 1.

The properties and the characteristics were measured and evaluated in the same manner as in Example 1.

5.3. Example 9

A temperature-adjustable autoclave equipped with a stirrer was sequentially charged with 300 parts by mass of water, 0.6 parts by mass of sodium dodecylbenzenesulfonate, 1.0 part by mass of potassium persulfate, 0.5 parts by mass of sodium hydrogen sulfite, 0.2 parts by mass of an alpha-methylstyrene dimer, 0.2 parts by mass of dodecylmercaptan, and the monomer components shown in Table 1 (i.e., 8 parts by mass of acrylonitrile, 12 parts by mass of itaconic acid, 25 parts by mass of acrylic acid, 2 parts by mass of 2-hydroxyethyl methacrylate, 3 parts by mass of methyl methacrylate, 12 parts by mass of styrene, and 38 parts by mass of 1,3-butadiene). The mixture was polymerized at 70° C. for 8 hours.

Specifically, the composition used in Example 9 was the same as that used in Example 5, but the monomer components were added in reverse order. In Example 5, the monomer components shown in Table 1 were added in the order of 38 parts by mass of 1,3-butadiene, 12 parts by mass of styrene, 3 parts by mass of methyl methacrylate, 25 parts by mass of acrylic acid, 12 parts by mass of itaconic acid, and 8 parts by mass of acrylonitrile. A repeating unit derived from 1,3-butadiene can be unevenly distributed in the surface of the polymer particles, and the surface acid content of the polymer particles can be reduced (although the composition used in Example 9 was the same as that used in Example 5) by thus controlling the order of addition of the monomer components.

When 3 hours had elapsed after the start of addition of the monomer components, 1.0 part by mass of an alpha-methylstyrene dimer and 0.3 parts by mass of dodecylmercaptan were added to the mixture. The temperature inside the autoclave was increased to 80° C., and the mixture was reacted for 2 hours to obtain a latex. The pH of the latex was adjusted to 7.0, followed by the addition of 5 parts by mass (solid basis) of potassium tripolyphosphate (10 mass % aqueous solution). The residual monomers were removed by steam distillation, and the residue was concentrated under reduced pressure to obtain an aqueous dispersion including particles of the polymer (A) (content: 35 mass %).

An electrical storage device electrode binder composition was prepared in the same manner as in Example 1, except that the resulting aqueous dispersion including particles of the polymer (A) was used, and the type and the amount of the component (C) were changed as shown in Table 1.

An electrical storage device electrode slurry was prepared in the same manner as in Example 1, except that the resulting binder composition was used, and the content of the active material was changed as shown in Table 1, and an electrical storage device electrode and an electrical storage device were produced in the same manner as in Example 1.

The properties and the characteristics were measured and evaluated in the same manner as in Example 1.

5.4. Example 10 and Comparative Examples 4 to 9

An aqueous dispersion including particles of the polymer (A) (solid content: 35 mass %) was obtained in the same manner as in Example 9, except that the type and the amount of each monomer were changed as shown in Tables 1 and 2. Specifically, a repeating unit derived from 1,3-butadiene was unevenly distributed in the surface of the polymer particles by adding the monomer components in reverse order as compared with Examples 1 to 8 and Comparative Examples 1 to 3.

An electrical storage device electrode binder composition was prepared in the same manner as in Example 1, except that the resulting aqueous dispersion including particles of the polymer (A) was used, and the type and the amount of the component (C) were changed as shown in Tables 1 and 2.

An electrical storage device electrode slurry was prepared in the same manner as in Example 1, except that the resulting binder composition was used, and the content of the active material was changed as shown in Tables 1 and 2, and an electrical storage device electrode and an electrical storage device were produced in the same manner as in Example 1.

The properties and the characteristics were measured and evaluated in the same manner as in Example 1.

5.5. Example 11

A temperature-adjustable autoclave equipped with a stirrer was sequentially charged with 300 parts by mass of water, 0.6 parts by mass of sodium dodecylbenzenesulfonate, 1.0 part by mass of potassium persulfate, 0.5 parts by mass of sodium hydrogen sulfite, 0.2 parts by mass of an alpha-methylstyrene dimer, 0.2 parts by mass of dodecylmercaptan, and the monomer components shown in Table 1 (i.e., 35 parts by mass of 1,3-butadiene, 40 parts by mass of styrene, 8 parts by mass of methyl methacrylate, 10 parts by mass of acrylonitrile, 2 parts by mass of acrylic acid, and 5 parts by mass of methacrylic acid). The mixture was polymerized at 70° C. for 8 hours. In Example 11, a repeating unit derived from acrylic acid and a repeating unit derived from methacrylic acid were unevenly distributed in the surface of the polymer particles, and the surface acid content of the polymer particles was increased by adding acrylic acid and methacrylic acid after adding the monomer components other than acrylic acid and methacrylic acid.

When 3 hours had elapsed after the start of addition of the monomer components, 1.0 part by mass of an alpha-methylstyrene dimer and 0.3 parts by mass of dodecylmercaptan were added to the mixture. The temperature inside the autoclave was increased to 80° C., and the mixture was reacted for 2 hours to obtain a latex. The pH of the latex was adjusted to 7.0, followed by the addition of 5 parts by mass (solid basis) of potassium tripolyphosphate (10 mass % aqueous solution). The residual monomers were removed by steam distillation, and the residue was concentrated under reduced pressure to obtain an aqueous dispersion including particles of the polymer (A) (content: 35 mass %).

An electrical storage device electrode binder composition was prepared in the same manner as in Example 1, except that the resulting aqueous dispersion including particles of the polymer (A) was used, and the type and the amount of the component (C) were changed as shown in Table 1.

An electrical storage device electrode slurry was prepared in the same manner as in Example 1, except that the resulting binder composition was used, and the content of the active material was changed as shown in Table 1, and an electrical storage device electrode and an electrical storage device were produced in the same manner as in Example 1.

The properties and the characteristics were measured and evaluated in the same manner as in Example 1.

5.6. Example 12

80 parts by mass (solid basis) of the polymer (A) synthesized in Example 1 and 20 parts by mass (solid basis) of polyacrylic acid ("185012500" manufactured by ACROS, average molecular weight: 240,000) were mixed and stirred, and an appropriate amount of water was added to the mixture to prepare an aqueous solution having a solid content of 35 mass %. A binder composition was prepared in the same manner as in Example 1, except that the resulting aqueous solution was used, and 2-n-octyl-4-isothiazolin-3-one was used as the component (C) at a concentration of 50 ppm. An electrical storage device electrode slurry was prepared in the same manner as in Example 1, except that the resulting binder composition was used, and the content of the active material was changed as shown in Table 3, and an electrical storage device electrode and an electrical storage device were produced in the same manner as in Example 1. The properties and the characteristics were measured and evaluated in the same manner as in Example 1. The evaluation results are shown in Table 3.

5.7. Example 13

40 parts by mass (solid basis) of the polymer (A) synthesized in Example 1 and 60 parts by mass (solid basis) of polyvinylpyrrolidone ("Polyvinylpyrrolidone K-30" manufactured by Nippon Shokubai Co., Ltd.) were mixed and stirred, and an appropriate amount of water was added to the mixture to prepare an aqueous solution having a solid content of 35 mass %. A binder composition was prepared in the same manner as in Example 1, except that the resulting aqueous solution was used, and 2-n-octyl-4-isothiazolin-3-one was used as the component (C) at a concentration of 50 ppm. An electrical storage device electrode slurry was prepared in the same manner as in Example 1, except that the resulting binder composition was used, and the content of the active material was changed as shown in Table 3, and an electrical storage device electrode and an electrical storage device were produced in the same manner as in Example 1. The properties and the characteristics were measured and evaluated in the same manner as in Example 1. The evaluation results are shown in Table 3.

5.8. Example 14

10 parts by mass (solid basis) of the polymer (A) synthesized in Example 1 and 90 parts by mass (solid basis) of the polymer synthesized in Example 11 were mixed and stirred to prepare an aqueous solution having a solid content of 35 mass %. A binder composition was prepared in the same manner as in Example 1, except that the resulting aqueous solution was used, and 2-n-octyl-4-isothiazolin-3-one was used as the component (C) at a concentration of 80 ppm. An electrical storage device electrode slurry was prepared in the same manner as in Example 1, except that the resulting binder composition was used, and the content of the active material was changed as shown in Table 3, and an electrical storage device electrode and an electrical storage device were produced in the same manner as in Example 1. The properties and the characteristics were measured and evaluated in the same manner as in Example 1. The evaluation results are shown in Table 3.

5.9. Evaluation Results

Tables 1 and 2 show the composition of the polymer (A), the composition of the binder composition, the composition of the slurry, and the evaluation results obtained in Examples 1 to 11 and Comparative Examples 1 to 9. Table 3 shows the evaluation results obtained in Examples 12 to 14.

TABLE 1

| | | | Example 1 | Example 2 | Example 3 | Example 4 | Example 5 | Example 6 |
|---|---|---|---|---|---|---|---|---|
| Component (A) | Conjugated diene compound | BD (parts by mass) | 49 | 38 | 33 | 35 | 38 | 43 |
| | Aromatic vinyl compound | ST (parts by mass) | 22 | 27 | 45 | 27 | 12 | 19 |
| | (Meth)acrylate compound | MMA (parts by mass) | 4 | 5 | 1 | 9 | 3 | 2 |
| | | HEMA (parts by mass) | 0 | 1 | 0 | 0 | 2 | 0 |
| | | Total (parts by mass) | 4 | 6 | 1 | 9 | 5 | 2 |
| | Unsaturated carboxylic acid | AA (parts by mass) | 7 | 11 | 11 | 20 | 25 | 0 |
| | | MAA (parts by mass) | 0 | 5 | 3 | 0 | 0 | 15 |
| | | FA (parts by mass) | 0 | 0 | 0 | 5 | 0 | 0 |
| | | TA (parts by mass) | 10 | 8 | 3 | 0 | 12 | 12 |
| | | Total (parts by mass) | 17 | 24 | 17 | 25 | 37 | 27 |
| | alpha,beta-Unsaturated nitrile compound | AN (parts by mass) | 8 | 5 | 4 | 4 | 8 | 9 |
| | Monomer mass ratio | $W_{A4}/W_{A1}$ | 0.35 | 0.63 | 0.52 | 0.71 | 0.97 | 0.63 |
| | | $W_{A4}/W_{A5}$ | 2.1 | 4.8 | 4.3 | 6.3 | 4.6 | 3.0 |
| | | $W_{A2}/W_{A1}$ | 0.45 | 0.71 | 1.36 | 0.77 | 0.32 | 0.44 |
| | Total (parts by mass) | | 100 | 100 | 100 | 100 | 100 | 100 |
| Component (B) | | | Water | Water | Water | Water | Water | Water |
| Component (C) | 2-Methyl-4-isothiazolin-3-one (ppm) | | — | — | 100 | — | — | — |
| | 2-n-Octyl-4-isothiazolin-3-one (ppm) | | — | 50 | — | — | — | — |
| | 5-Chloro-2-methyl-4-isothiazolin-3-one (ppm) | | 100 | — | — | 190 | — | — |
| | 1,2-Benzisothiazolin-3-one (ppm) | | — | — | — | — | 130 | 130 |
| Properties of polymer particles | | Average particle size (nm) | 220 | 180 | 140 | 220 | 200 | 170 |
| | | THF insoluble content (%) | 99 | 98 | 90 | 95 | 97 | 98 |
| | | Tg (° C.) | −20 | 7 | 15 | 13 | 8 | −4 |
| | | Zeta potential (mV) | −25 | −47 | −30 | −45 | −62 | −40 |
| | | Surface acid content (mmol/g) | 2.51 | 3.05 | 2.16 | 3.64 | 5.32 | 2.72 |
| Evaluation of binder composition | | Decay resistance test | A | A | A | A | A | A |
| | | Freezing temperature (° C.) | −0.7 | −0.6 | −0.6 | −0.6 | −0.8 | −0.6 |
| Active material | | C/SiO (parts by mass) | 20 | 20 | 0 | 10 | 35 | 15 |
| | | Graphite (parts by mass) | 80 | 80 | 100 | 90 | 65 | 85 |
| Evaluation of slurry | | Thread-forming capability (%) | 63 | 67 | 77 | 74 | 59 | 70 |
| Characteristics of electrode | | Peel strength (N/m) | 12 | 14 | 9 | 11 | 13 | 12 |
| | | Silicon content (%) | 19 | 18 | 0 | 9 | 30 | 14 |
| | | Polymer distribution coefficient | 0.9 | 0.88 | 0.73 | 0.9 | 0.92 | 0.83 |
| | | Density (g/cm$^2$) of active material layer | 1.6 | 1.6 | 1.8 | 1.6 | 1.5 | 1.6 |
| | | Crack ratio (%) | 0 | 0 | 0 | 0 | 0 | 0 |
| Characteristics of electrical storage device | | Charge rate (%) | 90 | 91 | 90 | 89 | 89 | 91 |
| | | Discharge rate (%) | 91 | 93 | 91 | 92 | 91 | 92 |
| Characteristics of electrical storage device after long-term storage | | Charge rate (%) | 89 | 91 | 90 | 90 | 90 | 89 |
| | | Discharge rate (%) | 91 | 92 | 91 | 92 | 91 | 92 |
| Thickness change ratio of active material layer | | Thickness ratio (%) after charge | 135 | 128 | 132 | 130 | 132 | 134 |

| | | | Example 7 | Example 8 | Example 9 | Example 10 | Example 11 |
|---|---|---|---|---|---|---|---|
| Component (A) | Conjugated diene compound | BD (parts by mass) | 40 | 47 | 38 | 43 | 35 |
| | Aromatic vinyl compound | ST (parts by mass) | 33 | 23 | 12 | 19 | 40 |
| | (Meth)acrylate compound | MMA (parts by mass) | 5 | 7 | 3 | 2 | 8 |
| | | HEMA (parts by mass) | 2 | 0 | 2 | 0 | 0 |
| | | Total (parts by mass) | 7 | 7 | 5 | 2 | 8 |
| | Unsaturated carboxylic acid | AA (parts by mass) | 11 | 3 | 25 | 0 | 2 |
| | | MAA (parts by mass) | 0 | 0 | 0 | 15 | 5 |
| | | FA (parts by mass) | 0 | 19 | 0 | 0 | 0 |
| | | TA (parts by mass) | 5 | 0 | 12 | 12 | 0 |
| | | Total (parts by mass) | 16 | 22 | 37 | 27 | 7 |
| | alpha,beta-Unsaturated nitrile compound | AN (parts by mass) | 4 | 1 | 8 | 9 | 10 |
| | Monomer mass ratio | $W_{A4}/W_{A1}$ | 0.40 | 0.47 | 0.97 | 0.63 | 0.20 |
| | | $W_{A4}/W_{A5}$ | 4.0 | 22.0 | 4.6 | 3.0 | 0.7 |
| | | $W_{A2}/W_{A1}$ | 0.83 | 0.49 | 0.32 | 0.44 | 1.14 |
| | Total (parts by mass) | | 100 | 100 | 100 | 100 | 100 |
| Component (B) | | | Water | Water | Water | Water | Water |
| Component (C) | 2-Methyl-4-isothiazolin-3-one (ppm) | | — | — | — | — | — |
| | 2-n-Octyl-4-isothiazolin-3-one (ppm) | | — | — | — | — | 120 |
| | 5-Chloro-2-methyl-4-isothiazolin-3-one (ppm) | | — | — | — | — | — |
| | 1,2-Benzisothiazolin-3-one (ppm) | | 130 | 130 | 130 | 130 | — |
| Properties of polymer particles | | Average particle size (nm) | 130 | 170 | 200 | 170 | 170 |
| | | THF insoluble content (%) | 88 | 92 | 98 | 98 | 87 |
| | | Tg (° C.) | 4 | −13 | 6 | −5 | 13 |
| | | Zeta potential (mV) | −27 | −40 | −50 | −39 | −20 |
| | | Surface acid content (mmol/g) | 2.30 | 3.69 | 4.00 | 1.80 | 1.10 |

TABLE 1-continued

|  |  | Example (cont.) | | | | |
|---|---|---|---|---|---|---|
| Evaluation of binder composition | Decay resistance test | A | A | A | A | A |
|  | Freezing temperature (° C.) | −0.6 | −0.7 | −0.7 | −0.6 | −0.5 |
| Active material | C/SiO (parts by mass) | 20 | 0 | 30 | 10 | 25 |
|  | Graphite (parts by mass) | 80 | 100 | 70 | 90 | 75 |
| Evaluation of slurry | Thread-forming capability (%) | 71 | 64 | 62 | 70 | 70 |
| Characteristics of electrode | Peel strength (N/m) | 10 | 9 | 11 | 11 | 7 |
|  | Silicon content (%) | 19 | 0 | 28 | 9 | 23 |
|  | Polymer distribution coefficient | 0.77 | 0.85 | 0.89 | 0.7 | 0.63 |
|  | Density (g/cm²) of active material layer | 1.6 | 1.7 | 1.6 | 17 | 1.7 |
|  | Crack ratio (%) | 0 | 0 | 0 | 0 | 0 |
| Characteristics of electrical storage device | Charge rate (%) | 89 | 91 | 88 | 90 | 82 |
|  | Discharge rate (%) | 90 | 92 | 90 | 92 | 85 |
| Characteristics of electrical storage device after long-term storage | Charge rate (%) | 89 | 89 | 89 | 87 | 80 |
|  | Discharge rate (%) | 91 | 90 | 91 | 90 | 81 |
| Thickness change ratio of active material layer | Thickness ratio (%) after charge | 136 | 138 | 131 | 133 | 139 |

TABLE 2

|  |  |  | Comparative Example 1 | Comparative Example 2 | Comparative Example 3 | Comparative Example 4 | Comparative Example 5 |
|---|---|---|---|---|---|---|---|
| Component (A) | Conjugated diene compound | BD (parts by mass) | 35 | 35 | 40 | 49 | 53 |
|  | Aromatic vinyl compound | ST (parts by mass) | 19 | 36 | 38 | 22 | 18 |
|  | (Meth)acrylate compound | MMA (parts by mass) | 0 | 8 | 5 | 4 | 2 |
|  |  | HEMA (parts by mass) | 0 | 0 | 4 | 0 | 0 |
|  |  | Total (parts by mass) | 0 | 8 | 9 | 4 | 2 |
|  | Unsaturated carboxylic acid | AA (parts by mass) | 25 | 2 | 0 | 7 | 0 |
|  |  | MAA (parts by mass) | 0 | 5 | 2 | 0 | 0 |
|  |  | FA (parts by mass) | 10 | 0 | 0 | 0 | 0 |
|  |  | TA (parts by mass) | 10 | 0 | 2 | 10 | 26 |
|  |  | Total (parts by mass) | 45 | 7 | 4 | 17 | 26 |
|  | alpha,beta-Unsaturated nitrile compound | AN (parts by mass) | 1 | 14 | 9 | 8 | 1 |
|  | Monomer mass ratio | $W_{A4}/W_{A1}$ | 1.29 | 0.20 | 0.10 | 0.35 | 0.49 |
|  |  | $W_{A4}/W_{A5}$ | 45.0 | 0.5 | 0.4 | 2.1 | 26.0 |
|  |  | $W_{A2}/W_{A1}$ | 0.54 | 1.03 | 0.95 | 0.45 | 0.34 |
|  |  | Total (parts by mass) | 100 | 100 | 100 | 100 | 100 |
| Component (B) |  |  | Water | Water | Water | Water | Water |
| Component (C) | 2-Methyl-4-isothiazolin-3-one (ppm) |  | — | — | — | — | — |
|  | 2-n-Octyl-4-isothiazolin-3-one (ppm) |  | 40 | 1700 | 800 | — | 700 |
|  | 5-Chloro-2-methyl-4-isothiazolin-3-one (ppm) |  | — | — | — | 100 | — |
|  | 1,2-Benzisothiazolin-3-one (ppm) |  | — | — | — | — | — |
| Properties of polymer particles | Average particle size (nm) |  | 200 | 170 | 170 | 210 | 190 |
|  | THF insoluble content (%) |  | 99 | 85 | 90 | 98 | 94 |
|  | Tg (° C.) |  | 20 | 15 | 8 | −20 | −30 |
|  | Zeta potential (mV) |  | −85 | −6 | −5 | −9 | −3 |
|  | Surface acid content (mmol/g) |  | 6.73 | 0.57 | 0.33 | 0.80 | 0.85 |
| Evaluation of binder composition | Decay resistance test |  | B | A | A | A | A |
|  | Freezing temperature (° C.) |  | −0.9 | −0.5 | −0.2 | −0.5 | −0.7 |
| Active material | C/SiO (parts by mass) |  | 35 | 10 | 20 | 15 | 15 |
|  | Graphite (parts by mass) |  | 65 | 90 | 80 | 85 | 85 |
| Evaluation of slurry | Thread-forming capability (%) |  | 24 | 72 | 67 | 65 | 71 |
| Characteristics of electrode | Peel strength (N/m) |  | 12 | 6 | 5 | 6 | 5 |
|  | Silicon content (%) |  | 31 | 9 | 19 | 14 | 14 |
|  | Polymer distribution coefficient |  | 0.9 | 0.55 | 0.52 | 0.58 | 0.58 |
|  | Density (g/cm³) of active material layer |  | 1.6 | 1.7 | 1.7 | 15 | 1.6 |
|  | Crack ratio (%) |  | 23 | 1 | 0 | 0 | 0 |
| Characteristics of electrical storage device | Charge rate (%) |  | 74 | 86 | 79 | 84 | 88 |
|  | Discharge rate (%) |  | 75 | 86 | 80 | 85 | 90 |
| Characteristics of electrical storage device after long-term storage | Charge rate (%) |  | 57 | 64 | 65 | 78 | 69 |
|  | Discharge rate (%) |  | 60 | 67 | 67 | 80 | 71 |
| Thickness change ratio of active material layer | Thickness ratio (%) after charge |  | 136 | 144 | 146 | 138 | 149 |

|  |  |  | Comparative Example 6 | Comparative Example 7 | Comparative Example 8 | Comparative Example 9 |
|---|---|---|---|---|---|---|
| Component (A) | Conjugated diene compound | BD (parts by mass) | 25 | 44 | 38 | 35 |
|  | Aromatic vinyl compound | ST (parts by mass) | 57 | 8 | 52 | 33 |

TABLE 2-continued

| | | | | | |
|---|---|---|---|---|---|
| (Meth)acrylate compound | MMA (parts by mass) | 0 | 12 | 2 | 3 |
| | HEMA (parts by mass) | 0 | 1 | 2 | 0 |
| | Total (parts by mass) | 0 | 13 | 4 | 3 |
| Unsaturated carboxylic acid | AA (parts by mass) | 11 | 0 | 2 | 29 |
| | MAA (parts by mass) | 1 | 0 | 0 | 0 |
| | FA (parts by mass) | 0 | 27 | 0 | 0 |
| | TA (parts by mass) | 2 | 0 | 1 | 0 |
| | Total (parts by mass) | 14 | 27 | 3 | 29 |
| alpha,beta-Unsaturated nitrile compound | AN (parts by mass) | 4 | 8 | 3 | 0 |
| Monomer mass ratio | $W_{A4}/W_{A1}$ | 0.56 | 0.61 | 0.08 | 0.83 |
| | $W_{A4}/W_{A5}$ | 3.5 | 3.4 | 1.0 | — |
| | $W_{A2}/W_{A1}$ | 2.28 | 0.18 | 1.37 | 0.94 |
| | Total (parts by mass) | 100 | 100 | 100 | 100 |
| Component (B) | | Water | Water | Water | Water |
| Component (C) | 2-Methyl-4-isothiazolin-3-one (ppm) | — | — | 120 | — |
| | 2-n-Octyl-4-isothiazolin-3-one (ppm) | — | — | — | — |
| | 5-Chloro-2-methyl-4-isothiazolin-3-one (ppm) | — | — | — | — |
| | 1,2-Benzisothiazolin-3-one (ppm) | — | 500 | — | 500 |
| Properties of polymer particles | Average particle size (nm) | 180 | 100 | 130 | 200 |
| | THF insoluble content (%) | 95 | 99 | 92 | 92 |
| | Tg (° C.) | 52 | −11 | 1 | 19 |
| | Zeta potential (mV) | −5 | −9 | −2 | −8 |
| | Surface acid content (mmol/g) | 0.77 | 0.88 | 0.12 | 0.94 |
| Evaluation of binder composition | Decay resistance test | C | A | A | A |
| | Freezing temperature (° C.) | −0.3 | −0.8 | −0.1 | −0.5 |
| Active material | C/SiO (parts by mass) | 5 | 30 | 30 | 15 |
| | Graphite (parts by mass) | 95 | 70 | 70 | 85 |
| Evaluation of slurry | Thread-forming capability (%) | 66 | 57 | 65 | 72 |
| Characteristics of electrode | Peel strength (N/m) | 6 | 7 | 5 | 5 |
| | Silicon content (%) | 4 | 28 | 28 | 14 |
| | Polymer distribution coefficient | 0.5 | 0.57 | 0.42 | 0.6 |
| | Density (g/cm³) of active material layer | 1.6 | 1.7 | 1.6 | 1.7 |
| | Crack ratio (%) | 33 | 1 | 5 | 0 |
| Characteristics of electrical storage device | Charge rate (%) | 81 | 75 | 84 | 82 |
| | Discharge rate (%) | 83 | 79 | 86 | 85 |
| Characteristics of electrical storage device after long-term storage | Charge rate (%) | 55 | 67 | 78 | 70 |
| | Discharge rate (%) | 57 | 69 | 80 | 71 |
| Thickness change ratio of active material layer | Thickness ratio (%) after charge | 132 | 145 | 133 | 135 |

The abbreviation of each monomer shown in Tables 1 and 2 has the following meaning.
BD: 1,3-butadiene
ST: styrene
MMA: methyl methacrylate
HEMA: 2-hydroxyethyl methacrylate
AA: acrylic acid
MAA: methacrylic acid
FA: fumaric acid
TA: itaconic acid
AN: acrylonitrile The abbreviation of each active material shown in Tables 1 and 2 has the following meaning.
C/SiO: graphite-coated silicon oxide
Graphite: "MAG" manufactured by Hitachi Chemical Co., Ltd.

TABLE 3

| | | Example 12 | Example 13 | Example 14 |
|---|---|---|---|---|
| Properties of polymer particles | Surface acid content (mmol/g) | 2.01 | 1.01 | 1.25 |
| Evaluation of binder composition | Decay resistance test | A | A | A |
| | Freezing temperature (° C.) | −0.9 | −0.8 | −0.6 |
| Active material | C/SiO (parts by mass) | 35 | 35 | 30 |
| | Graphite (parts by mass) | 65 | 65 | 70 |
| Evaluation of slurry | Thread-forming capability (%) | 75 | 75 | 68 |
| Characteristics of electrode | Peel strength (N/m) | 11 | 10 | 11 |
| | Silicon content (%) | 30 | 30 | 27 |
| | Polymer distribution coefficient | 0.7 | 0.61 | 0.69 |
| | Density (g/cm³) of active material layer | 1.7 | 1.7 | 1.6 |
| | Crack ratio (%) | 0 | 0 | 0 |
| Characteristics of electrical storage device | Charge rate (%) | 90 | 89 | 89 |
| | Discharge rate (%) | 91 | 91 | 92 |
| Characteristics of electrical storage device after long-term storage | Charge rate (%) | 89 | 88 | 89 |
| | Discharge rate (%) | 90 | 90 | 91 |
| Thickness change ratio of active material layer | Thickness ratio (%) after charge | 136 | 135 | 138 |

As is clear from the results shown in Tables 1 to 3, the slurries prepared using the binder compositions obtained in Examples 1 to 14 produced an electrode having a low crack ratio and excellent adhesion as compared with those obtained in Comparative Examples 1 to 9. The electrical storage device (lithium-ion secondary battery) including the resulting electrode exhibited excellent charge-discharge rate characteristics. Since the change in thickness of the active material layer due to charge was reduced in Examples 1 to 14 as compared with Comparative Examples 1 to 9 (see Tables 1 and 2), it is considered that the active material can be strongly held within the active material layer, and removal of the active material can be suppressed.

It was confirmed that the electrical storage device (lithium-ion secondary battery) including the electrode produced using the binder composition stored at 2° C. for 5 months in a refrigerator exhibited charge-discharge rate characteristics comparable to those achieved using the binder composition immediately after preparation. It was thus confirmed that the binder composition according to the embodiments of the invention exhibits excellent long-term storage stability.

The invention is not limited to the above embodiments. Various modifications and variations may be made of the above embodiments. For example, the invention includes various other configurations substantially the same as the configurations described in connection with the above embodiments (e.g., a configuration having the same function, method, and results, or a configuration having the same objective and results). The invention also includes a configuration in which an unsubstantial element described in connection with the above embodiments is replaced with another element. The invention also includes a configuration having the same effects as those of the configurations described in connection with the above embodiments, or a configuration capable of achieving the same objective as that of the configurations described in connection with the above embodiments. The invention further includes a configuration in which a known technique is added to the configurations described in connection with the above embodiments.

REFERENCE SIGNS LIST

10: collector, 20: active material layer, 100: electrical storage device electrode

The invention claimed is:

1. An electrical storage device electrode binder composition comprising:
a polymer (A) and a liquid medium (B),
wherein the polymer (A) comprises:
a repeating unit (A1) comprising, in reacted form, a conjugated diene compound in an amount of 30 to 50 parts by mass,
a repeating unit (A2) comprising, in reacted form, an aromatic vinyl compound in an amount of 10 to 50 parts by mass,
a repeating unit (A3) comprising, in reacted form, a (meth)acrylate compound in an amount of 1 to 10 parts by mass,
a repeating unit (A4) comprising, in reacted form, an unsaturated carboxylic acid in an amount of 5 to 40 parts by mass, and
a repeating unit (A5) comprising, in reacted form, an alpha, beta-unsaturated nitrile compound in an amount of 1 to 10 parts by mass,
based on 100 parts by mass of total repeating units included in the polymer (A), and
wherein the polymer (A) is in particle form, and the polymer particles have a surface acid content of more than 1 mmol/g and 6 mmol/g or less.

2. The electrical storage device electrode binder composition according to claim 1, wherein the polymer particles have a zeta potential of −80 to −10 mV.

3. The electrical storage device electrode binder composition according to claim 1, wherein a mass ratio $W_{A4}/W_{A1}$ is 0.3 to 1, and a mass ratio $W_{A4}/W_{A5}$ is 1.8 to 25, wherein $W_{A1}$ is a mass of the repeating unit (A1), $W_{A4}$ is a mass of the repeating unit (A4), and $W_{A5}$ is a mass of the repeating unit (A5).

4. The electrical storage device electrode binder composition according to claim 1, wherein a mass ratio $W_{A2}/W_{A1}$ is 0.3 to 1.5, wherein $W_{A1}$ is a mass of the repeating unit (A1), and $W_{A2}$ is a mass of the repeating unit (A2).

5. The electrical storage device electrode binder composition according to claim 1, wherein the polymer (A) comprises two or more repeating units comprising, in reacted form, an unsaturated carboxylic acid as the repeating unit (A4).

6. The electrical storage device electrode binder composition according to claim 1, wherein the polymer particles have an average particle size of 50 to 400 nm.

7. The electrical storage device electrode binder composition according to claim 1, further comprising an isothiazoline-based compound (C).

8. The electrical storage device electrode binder composition according to claim 7, comprising the isothiazoline-based compound (C) at a concentration of 50 ppm or more and less than 200 ppm.

9. An electrical storage device electrode slurry comprising the electrical storage device electrode binder composition according to claim 1, and an active material.

10. The electrical storage device electrode slurry according to claim 9, comprising a silicon material as the active material.

11. The electrical storage device electrode slurry according to claim 9, having a thread-forming capability of 30 to 80%.

12. An electrical storage device electrode comprising a collector, and an active material layer that is formed by applying the electrical storage device electrode slurry according to claim 9 to a surface of the collector, and drying the applied electrical storage device electrode slurry.

13. The electrical storage device electrode according to claim 12, comprising silicon in an amount of 2 to 30 parts by mass based on 100 parts by mass of the active material layer.

14. The electrical storage device electrode according to claim 12, wherein the active material layer has a polymer distribution coefficient of 0.6 to 1.0.

15. An electrical storage device comprising the electrical storage device electrode according to claim 12.

16. The electrical storage device electrode according to claim 12, wherein the active material layer comprises a silicon material.

* * * * *